(12) United States Patent
Weber et al.

(10) Patent No.: US 9,322,967 B2
(45) Date of Patent: Apr. 26, 2016

(54) APODIZED BROADBAND PARTIAL REFLECTORS

(71) Applicant: 3M INNOVATIVE PROPERTIES COMPANY, Saint Paul, MN (US)

(72) Inventors: Michael F. Weber, Shoreview, MN (US); Timothy J. Nevitt, Red Wing, MN (US); John A. Wheatley, Lake Elmo, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 39 days.

(21) Appl. No.: 14/352,900

(22) PCT Filed: Oct. 17, 2012

(86) PCT No.: PCT/US2012/060488
§ 371 (c)(1),
(2) Date: Apr. 18, 2014

(87) PCT Pub. No.: WO2013/059231
PCT Pub. Date: Apr. 25, 2013

(65) Prior Publication Data
US 2014/0240829 A1    Aug. 28, 2014

Related U.S. Application Data

(60) Provisional application No. 61/549,600, filed on Oct. 20, 2011.

(51) Int. Cl.
*G02F 1/1335* (2006.01)
*G02B 5/28* (2006.01)
(Continued)

(52) U.S. Cl.
CPC .............. *G02B 5/285* (2013.01); *G02B 5/0841* (2013.01); *G02B 5/287* (2013.01); *G02B 5/305* (2013.01); *G02B 5/3041* (2013.01); *G02B 27/142* (2013.01)

(58) Field of Classification Search
CPC ........ G02B 5/285–5/288; G02B 5/08–5/0875; G02B 5/3041; G02B 5/305; G02B 5/3083–5/32
USPC .......................... 359/485.03, 489.01, 489.08, 359/489.11–489.13, 489.15–489.16, 577, 359/583–584, 588–589
See application file for complete search history.

(56) References Cited

U.S. PATENT DOCUMENTS 3,610,729 A    10/1971 Rogers
4,446,305 A    5/1984 Rogers
(Continued)

FOREIGN PATENT DOCUMENTS

WO    WO 2008-144636    11/2008
WO    WO 2008-144656    11/2008
(Continued)

OTHER PUBLICATIONS

Schrenk, "Nanolayer Polymeric Optical Films", Tappi Journal, Jun. 1992, pp. 169-174.
(Continued)

*Primary Examiner* — Jordan Schwartz
*Assistant Examiner* — George G King
(74) *Attorney, Agent, or Firm* — Daniel J. Iden

(57) ABSTRACT

A broadband partial reflector includes a multilayer polymeric optical film having a total number of optical repeating units that monotonically increases in thickness value from a first side to a second side of the multilayer polymeric optical film. A baseline optical repeating unit thickness profile is defined by a first plurality of optical repeating units and having a first average slope, and a first apodized thickness profile of the multilayer polymeric optical film is defined by a second plurality of optical repeating units having a second average slope being at least 5 times greater than the first average slope. The second plurality of optical repeating units define the first side of the multilayer polymeric optical film and join the first plurality of optical repeating units. The second plurality of optical repeating units are in a range from 3-15% of the total number of optical repeating units.

19 Claims, 15 Drawing Sheets

(51) Int. Cl.
*G02B 5/08* (2006.01)
*G02B 5/30* (2006.01)
*G02B 27/14* (2006.01)

(56) References Cited

U.S. PATENT DOCUMENTS

| | | |
|---|---|---|
| 5,486,949 A | 1/1996 | Schrenk |
| 5,882,774 A | 3/1999 | Jonza |
| 6,157,490 A | 12/2000 | Wheatley |
| 6,179,948 B1 | 1/2001 | Merrill |
| 6,783,349 B2 | 8/2004 | Neavin |
| 7,064,897 B2 | 6/2006 | Hebrink |
| 7,791,687 B2 | 9/2010 | Weber |
| 2004/0125450 A1 | 7/2004 | Hebrink |
| 2008/0151147 A1 | 6/2008 | Weber |
| 2011/0199352 A1* | 8/2011 | Wheatley et al. ............. 345/207 |
| 2011/0272849 A1 | 11/2011 | Neavin |
| 2013/0063818 A1 | 3/2013 | Weber |
| 2013/0250405 A1* | 9/2013 | Kivel et al. ................... 359/359 |

FOREIGN PATENT DOCUMENTS

| | | |
|---|---|---|
| WO | WO 2011-050226 | 4/2011 |
| WO | WO 2011-050268 | 4/2011 |
| WO | WO 2011-139618 | 11/2011 |
| WO | WO 2011-146288 | 11/2011 |

OTHER PUBLICATIONS

International Search Report for International PCT Application No. PCT/US2012/060488 Mailed on Feb. 7, 2013, 3 pages.

* cited by examiner

APODIZED BROADBAND PARTIAL REFLECTORS

FIELD

The present disclosure relates to, among other things, an optical film construction that provides a smooth spectrum for the in-band transmitted and reflected light of broadband partial reflectors.

BACKGROUND

Multilayer optical films are known. Such films can incorporate a large number of thin layers of different light transmissive materials, the layers being referred to as microlayers because they are thin enough so that the reflection and transmission characteristics of the optical film are determined in large part by constructive and destructive interference of light reflected from the layer interfaces. Depending on the amount of birefringence (if any) exhibited by the individual microlayers, and the relative refractive index differences for adjacent microlayers, and also on other design characteristics, the multilayer optical films can be made to have reflection and transmission properties that may be characterized as a reflective polarizer in some cases, and as a mirror in other cases, for example.

Reflective polarizers composed of a plurality of microlayers whose in-plane refractive indices are selected to provide a substantial refractive index mismatch between adjacent microlayers along an in-plane block axis and a substantial refractive index match between adjacent microlayers along an in-plane pass axis, with a sufficient number of layers to ensure high reflectivity for normally incident light polarized along one principal direction, referred to as the block axis, while maintaining low reflectivity and high transmission for normally incident light polarized along an orthogonal principal direction, referred to as the pass axis, have been known for some time. See, e.g., U.S. Pat. No. 3,610,729 (Rogers), U.S. Pat. No. 4,446,305 (Rogers et al.), and U.S. Pat. No. 5,486,949 (Schrenk et al.).

More recently, researchers from 3M Company have pointed out the significance of layer-to-layer refractive index characteristics of such films along the direction perpendicular to the film, i.e. the z-axis, and shown how these characteristics play an important role in the reflectivity and transmission of the films at oblique angles of incidence. See, e.g., U.S. Pat. No. 5,882,774 (Jonza et al.). Jonza et al. teach, among other things, how a z-axis mismatch in refractive index between adjacent microlayers, more briefly termed the z-index mismatch or $\Delta n_z$, can be tailored to allow the construction of multilayer stacks for which the Brewster angle—the angle at which reflectance of p-polarized light at an interface goes to zero—is very large or is nonexistent. This in turn allows for the construction of multilayer mirrors and polarizers whose interfacial reflectivity for p-polarized light decreases slowly with increasing angle of incidence, or is independent of angle of incidence, or increases with angle of incidence away from the normal direction. As a result, multilayer films having high reflectivity for both s- and p-polarized light for any incident direction in the case of mirrors, and for the selected direction in the case of polarizers, over a wide bandwidth, can be achieved.

Some multilayer optical films are designed for narrow band operation, i.e., over a narrow range of wavelengths, while others are designed for use over a broad wavelength range such as substantially the entire visible or photopic spectrum, or the visible or photopic wavelength range together with near infrared wavelengths, for example. Over the years, designers and manufacturers of the latter type of films, i.e., broadband multilayer optical films, have had to deal with the issue of color. The color issue often arises when the film is intended for use in a visual display system, e.g., where the film is a broadband reflective polarizer or a broadband mirror, and the display system is a liquid crystal display, luminaire, or backlight. A broadband reflector generally includes a multilayer polymeric optical film having a total number of optical repeating units that monotonically increases in thickness value from a first side to a second side of the multilayer polymeric optical film. This arrangement of layer thicknesses is referred to as a graded layer thickness profile. In such systems, it is typically undesirable for the film to impart a significant colored (non-white) appearance to the display, whether at normal incidence or for obliquely incident light. The colored appearance occurs when the film has transmission or reflection characteristics that are not uniform over the visible portion of the spectrum. In the case of coextruded polymeric multilayer optical films, such non-uniformities are typically the result of imperfect control of the layer thickness profile of the film relative to a target profile. To avoid the color issue, polymeric multilayer optical films are often designed to provide along their principal axes either extremely low reflectivity and high transmission (e.g. for a pass axis of a reflective polarizer that is viewed in transmission) or extremely high reflectivity and low transmission (e.g. for a block axis of a reflective polarizer, or for any in-plane axis of a reflective mirror film that is viewed in reflected light).

Recently, broadband polymeric multilayer optical films have been proposed that have intermediate amounts of reflectivity and transmission for light polarized parallel to at least one principal optic axis so that some significant amount of incident light is reflected, and another significant amount of the incident light (typically, the remainder of the incident light that is not reflected) is transmitted. Such films are referred to herein as partially reflecting multilayer optical films, or partially transmitting multilayer optical films. One approach to addressing color issues in such films is to provide them with only a single packet of microlayers with a carefully tailored layer thickness profile, and to manufacture them without the use of any layer multiplier devices, to provide maximum control of the layer thickness profile and a corresponding minimum spectral variability in transmission or reflection over the visible wavelength range. However even a carefully tailored layer thickness profile does not reduce color issues resulting from in-band ringing.

BRIEF SUMMARY

The present disclosure describes apodized broadband reflectors that exhibit reduced in-band spectral ringing, among other things.

In many embodiments, a broadband partial reflector is described. The broadband partial reflector includes a multilayer polymeric optical film having a total number of optical repeating units that monotonically increases in thickness value from a first side to a second side of the multilayer polymeric optical film. A baseline optical repeating unit thickness profile is defined by a first plurality of optical repeating units having a first average slope. A first apodized thickness profile of the multilayer polymeric optical film is defined by a second plurality of optical repeating units and having a second average slope being at least 5 times greater than the first average slope. The second plurality of optical repeating units define the first side of the multilayer polymeric optical film and join the first plurality of optical repeating units. The second plurality of optical repeating units are in a range from 3% to 15% or from 5% to 10% of the total number of optical repeating units.

In some embodiments, a broadband partial reflector includes a second apodized thickness profile and is described herein. This broadband partial reflector is similar to the embodiment described above and further includes a second apodized thickness profile of the multilayer polymeric optical film defined by a third plurality of optical repeating units having a third average slope being at least 5 times greater than the first average slope. The third plurality of optical repeating units define the second side of the multilayer polymeric optical film and join the first plurality of optical repeating units. The third plurality of optical repeating units are in a range from 5-10% or from 3-15% of the total number of optical repeating units.

The optical film (e.g., broadband partial reflector), and film articles described herein may provide one or more advantages over prior optical films or film articles. For example, prior broadband partial reflectors were susceptible to in-band ringing, while the broadband partial reflectors described herein substantially eliminate in-band ringing. Accordingly, the broadband partial reflectors described herein provide a smoother spectrum for the in-band transmitted and reflected light. These and other advantages of the various embodiments of the devices and methods described herein will be readily apparent to those of skill in the art upon reading the disclosure presented herein.

BRIEF DESCRIPTION OF THE DRAWINGS

The disclosure may be more completely understood in consideration of the following detailed description of various embodiments of the disclosure in connection with the accompanying drawings, in which.

Figure 1:
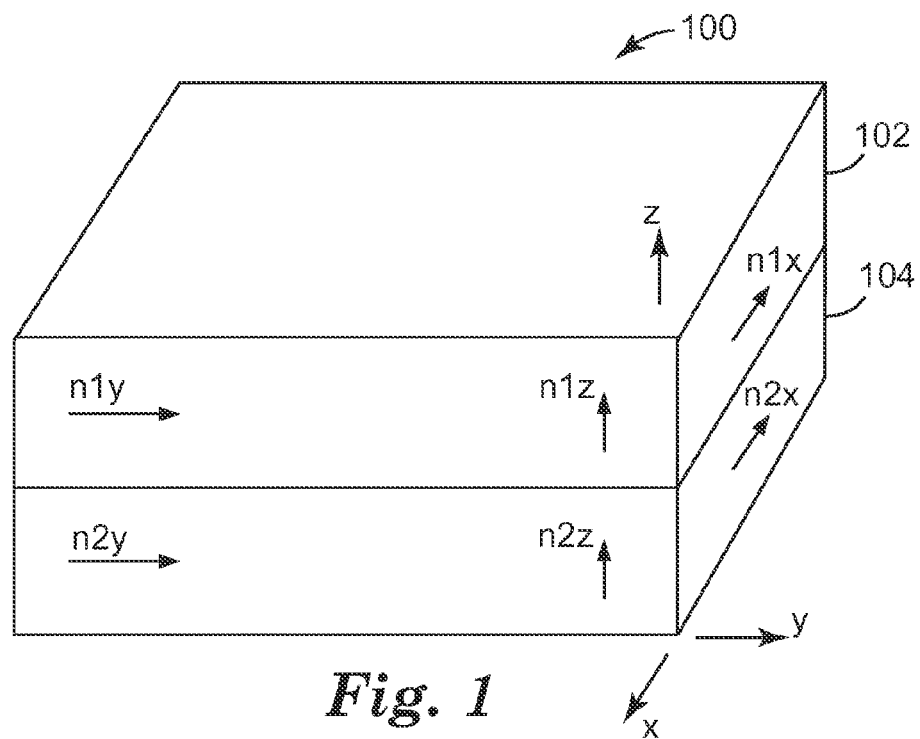
FIG. 1 is a schematic perspective view of an exemplary optical repeat unit (ORU) of a multilayer optical film.

The schematic drawings presented herein are not necessarily to scale. Like numbers used in the figures refer to like components, steps and the like. However, it will be understood that the use of a number to refer to a component in a given figure is not intended to limit the component in another figure labeled with the same number. In addition, the use of different numbers to refer to components is not intended to indicate that the different numbered components cannot be the same or similar.

DETAILED DESCRIPTION

In the following detailed description, reference is made to the accompanying drawings that form a part hereof, and in which are shown by way of illustration several specific embodiments of devices, systems and methods. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

Any direction referred to herein, such as "top," "bottom," "left," "right," "upper," "lower," "above," "below," and other directions and orientations are described herein for clarity in reference to the figures and are not to be limiting of an actual device or system or use of the device or system. Many of the devices, articles or systems described herein may be used in a number of directions and orientations.

The present disclosure describes, among other things, an optical film construction that provides a smooth spectrum for the in-band transmitted and reflected light of broadband partial reflectors. As described herein, the broadband partial reflectors described herein substantially eliminate in-band ringing. Accordingly, the broadband partial reflectors described herein provide a smooth spectrum for the in-band transmitted and reflected light. It has been found that broadband partial reflector optical film that has apodized graded thickness profile reduces or substantially eliminates in-band spectrum ringing and consequentially reduces or substantially eliminates undesired color. The term "apodization," sometimes referred to as "tapering," is derived from a class of mathematical techniques that generally are applied in the fields of signal processing, electromagnetics and optics. When physical structures interact with electromagnetic fields, such as a polymeric multilayer optical film interacting with infrared, visible, and/or ultraviolet light, spectral features will generally occur that are the result of the discontinuities associated with the terminations of a graded, resonant layer profile. For the present disclosure, we use the term apodization to describe a technique to terminate a graded layer thickness profile so as to minimize undesirable spectral features such as spectral ringing.

The broadband partial reflectors described herein may be used for any suitable purpose, including but not limited to optical displays, optical graphics or the like. While the present disclosure is not so limited, an appreciation of various aspects of the disclosure will be gained through a discussion of the examples provided below.

As mentioned above, one challenge faced by designers and manufacturers of polymeric multilayer optical films that are intended to be both (1) partially reflecting along a principal axis at normal and oblique angles and (2) broadband (i.e., intended to provide partial reflectivity over a broad wavelength range) is unintended and undesired color. Such undesired color is can be manifested as relatively high frequency variability in the optical transmission and reflection spectra. For purposes of the figures illustrated and described herein, for simplicity, the multilayer optical film bodies are assumed to have no spatial variability in the plane of the film body. Thus, the spectral reflection and transmission characteristics of a given film body are assumed to be independent of the position or location on the film (e.g., the (x,y) coordinate) at which they are measured.

Referring now to FIG. 1, a schematic perspective view of an exemplary optical repeat unit (ORU) of a multilayer optical film is illustrated. FIG. 1 depicts only two layers of a multilayer optical film 100, which can include tens or hundreds of such layers arranged in one or more contiguous packets or stacks. The film 100 includes individual microlayers 102, 104, where "microlayers" refer to layers that are sufficiently thin so that light reflected at a plurality of interfaces between such layers undergoes constructive or destructive interference to give the multilayer optical film the desired reflective or transmissive properties. The microlayers 102, 104 can together represent one optical repeat unit (ORU) of the multilayer optical stack, an ORU being the smallest set of layers that recur in a repeating pattern throughout the thickness of the stack. The microlayers have different refractive index characteristics so that some light is reflected at interfaces between adjacent microlayers. For optical films designed to reflect light at ultraviolet, visible, or near-infrared wavelengths, each microlayer typically has an optical thickness (i.e., a physical thickness multiplied by refractive index) of less than about 1 micrometer. Thicker layers can, however, also be included, such as skin layers at the outer surfaces of the film, or protective boundary layers (PBL) disposed within the film that separate packets of microlayers, as desired.

Refractive indices of one of the microlayers (e.g. layer 102 of FIG. 1, or the "A" layers of FIG. 2 below) for light polarized along principal x-, y-, and z-axes are n1x, n1y, and n1z, respectively. The mutually orthogonal x-, y-, and z-axes can, for example, correspond to the principal directions of the dielectric tensor of the material. In many embodiments, and for discussion purposes, the principle directions of the different materials are coincident, but this need not be the case in general. The refractive indices of the adjacent microlayer (e.g. layer 104 in FIG. 1, or the "B" layers in FIG. 2) along the same axes are n2x, n2y, n2z, respectively. The differences in refractive index between these layers are $\Delta nx$ ($=n1x-n2x$) along the x-direction, $\Delta ny$ ($=n1y-n2y$) along the y-direction, and $\Delta nz$ ($=n1z-n2z$) along the z-direction. The nature of these refractive index differences, in combination with the number of microlayers in the film (or in a given stack of the film) and their thickness distribution, controls the reflective and transmissive characteristics of the film (or of the given stack of the film). For example, if adjacent microlayers have a large refractive index mismatch along one in-plane direction ($\Delta nx$ large) and a small refractive index mismatch along the orthogonal in-plane direction ($\Delta ny \approx 0$), the film or packet may behave as a reflective polarizer for normally incident light. A reflective polarizer may be considered to be an optical body that strongly reflects normally incident light that is polarized along one in-plane axis, referred to as the "block axis", if the wavelength is within the reflection band of the packet, and strongly transmits such light that is polarized along an orthogonal in-plane axis, referred to as the "pass axis".

If desired, the refractive index difference ($\Delta nz$) between adjacent microlayers for light polarized along the z-axis can also be tailored to achieve desirable reflectivity properties for the p-polarization component of obliquely incident light. To maintain near on-axis reflectivity of p-polarized light at oblique angles of incidence, the z-index mismatch $\Delta nz$ between microlayers can be controlled to be substantially less than the maximum in-plane refractive index difference $\Delta nx$, such that $\Delta nz \leq 0.5 * \Delta nx$. Alternatively, $\Delta nz \leq 0.25 * \Delta nx$. A zero or near zero magnitude z-index mismatch yields interfaces between microlayers whose reflectivity for p-polarized light is constant or near constant as a function of incidence angle. Furthermore, the z-index mismatch $\Delta nz$ can be controlled to have the opposite polarity compared to the in-plane index difference $\Delta nx$, i.e., $\Delta nz < 0$. This condition yields interfaces whose reflectivity for p-polarized light increases with increasing angles of incidence, as is the case for s-polarized light. If $\Delta nz > 0$, then the reflectivity for p-polarized light decreases with angle of incidence. The foregoing relationships also of course apply to relationships involving $\Delta nz$ and $\Delta ny$, e.g., in cases where significant reflectivity and transmission are desired along two principal in-plane axes (such as a balanced or symmetric partially reflecting mirror film, or a partial polarizing film whose pass axis has significant reflectivity at normal incidence).

Figure 2:
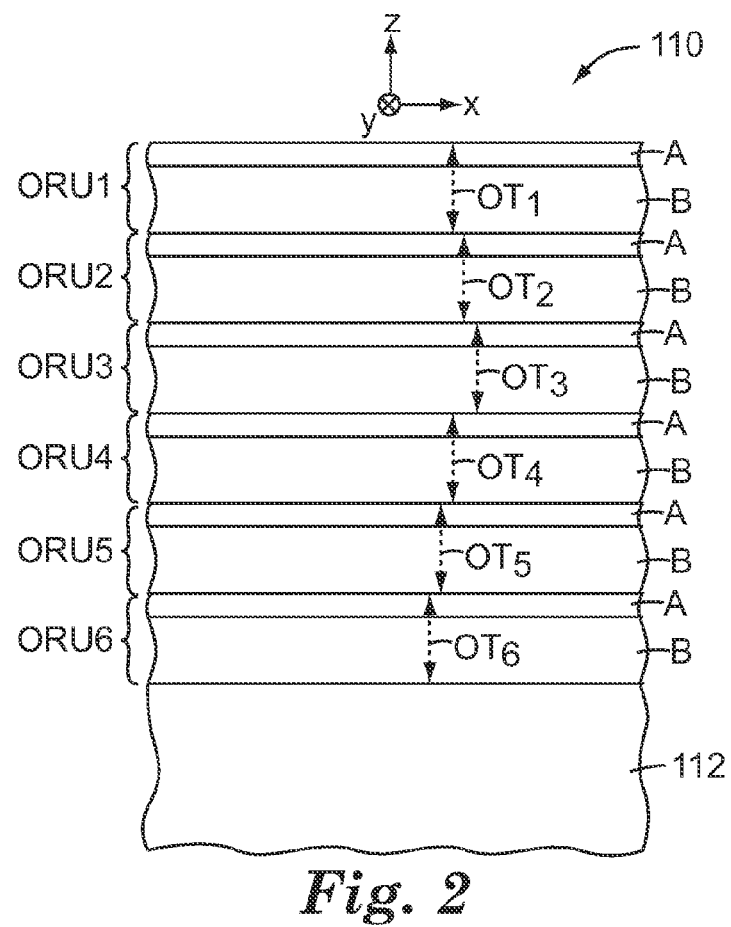
FIG. 2 is a schematic perspective view of a portion of a multilayer optical film, this view showing a packet of microlayers and a plurality of ORUs.

In the schematic side view of FIG. 2, more interior layers of a multilayer film 110 are shown so that multiple ORUs can be seen. The film is shown in relation to a local x-y-z Cartesian coordinate system, where the film extends parallel to the x- and y-axes, and the z-axis is perpendicular to the film and its constituent layers and parallel to a thickness axis of the film.

In FIG. 2, the microlayers are labeled "A" or "B", the "A" layers being composed of one material and the "B" layers being composed of a different material, these layers being stacked in an alternating arrangement to form optical repeat units or unit cells ORU 1, ORU 2, . . . ORU 6 as shown. In many embodiments, a multilayer optical film composed entirely of polymeric materials would include many more than 6 optical repeat units if high reflectivities are desired. The multilayer optical film 110 is shown as having a substantially thicker layer 112, which may represent an outer skin layer, or a protective boundary layer ("PBL", see U.S. Pat. No. 6,783,349 (Neavin et al.)) that separates the stack of microlayers shown in the figure from another stack or packet of microlayers (not shown). If desired, two or more separate multilayer optical films can be laminated together, e.g. with one or more thick adhesive layers, or using pressure, heat, or other methods to form a laminate or composite film.

In some cases, the microlayers can have thicknesses and refractive index values corresponding to a 1/4-wave stack, i.e., arranged in ORUs each having two adjacent microlayers of equal optical thickness (f-ratio=50%, the f-ratio being the ratio of the optical thickness of a constituent layer "A" to the optical thickness of the complete optical repeat unit), such ORU being effective to reflect by constructive interference light whose wavelength $\lambda$ is twice the overall optical thickness of the optical repeat unit, where the "optical thickness" of a body refers to its physical thickness multiplied by its refractive index. In other cases, the optical thickness of the microlayers in an optical repeat unit may be different from each other, whereby the f-ratio is greater than or less than 50%. For purposes of the present application, we contemplate multilayer optical films whose f-ratio may be any suitable value, and do not limit ourselves to films whose f-ratio of 50%. Accordingly, in the embodiment of FIG. 2, the "A" layers are depicted for generality as being thinner than the "B" layers. Each depicted optical repeat unit (ORU 1, ORU 2, etc.) has an optical thickness (OT1, OT2, etc.) equal to the sum of the optical thicknesses of its constituent "A" and "B" layer, and each optical repeat unit reflects light whose wavelength $\lambda$ is twice its overall optical thickness.

In exemplary embodiments, the optical thicknesses of the ORUs differ according to a thickness gradient along the z-axis or thickness direction of the film, whereby the optical thickness of the optical repeat units increases, decreases, or follows some other functional relationship as one progresses from one side of the stack (e.g. the top) to the other side of the stack (e.g. the bottom). Such thickness gradients can be used to provide a widened reflection band to provide substantially spectrally flat transmission and reflection of light over the extended wavelength band of interest, and also over all angles of interest. Alternatively, the layer thickness gradient of the disclosed packets of microlayers may be deliberately tailored to provide reflection and transmission spectra that change significantly over the wavelength range of interest. For example, it may be desirable for the multilayer optical film body to transmit (or reflect) more blue light than red light, or vice versa, or to transmit (or reflect) more green light than blue light and red light. Although such desired spectral non-uniformities may cause the multilayer optical film body to exhibit a colored (non-clear or non-neutral) appearance, this desired color is often distinguishable from the undesired color discussed elsewhere herein in that the desired color is associated with relatively slow changes in the spectral reflection or transmission, whereas the undesired color is associated with faster changes in those parameters as a function of wavelength. For example, spectral non-uniformities in reflection or transmission associated with desired color may vary as a function of wavelength with characteristic periods of about 100 nm or greater, whereas spectral non-uniformities in reflection or transmission associated with undesired color may vary as a function of wavelength with characteristic periods of less than about 50 nm, although this number depends somewhat on the magnitude of localized disruptions in the layer thickness profile.

To achieve reflectivity with a reasonable number of layers, adjacent microlayers may exhibit a difference in refractive index ($\Delta nx$) for light polarized along the x-axis of at least 0.03, for example. If high reflectivity is desired for two orthogonal polarizations, then the adjacent microlayers also may exhibit a difference in refractive index ($\Delta ny$) for light polarized along the y-axis of at least 0.03, for example. In some cases, adjacent microlayers may have refractive index mismatches along the two principal in-plane axes ($\Delta nx$ and $\Delta ny$) that are close in magnitude, in which case the film or packet may behave as an on-axis mirror or partial mirror. Alternatively, for reflective polarizers that are designed to be partially reflective for the pass axis polarization, adjacent microlayers may exhibit a large difference in refractive index ($\Delta nx$) for light polarized along the x-axis and a smaller but still substantial difference in refractive index ($\Delta ny$) for light polarized along the y-axis. In variations of such embodiments, the adjacent microlayers may exhibit a refractive index match or mismatch along the z-axis ($\Delta nz=0$ or $\Delta nz$ large), and the mismatch may be of the same or opposite polarity or sign as the in-plane refractive index mismatch(es). Such tailoring of $\Delta nz$ plays a key role in whether the reflectivity of the p-polarized component of obliquely incident light increases, decreases, or remains the same with increasing incidence angle.

Although the examples herein describe reflectors whose reflectivity increases with angle of incidence, partial reflectors whose reflectivity along a given principal axis decreases with angle of incidence can be made with reduced color using the same techniques described herein. This is particularly important for films whose reflectivity is large at normal incidence and are viewed in transmitted light at various angles, including normal incidence.

At least some of the microlayers in at least one packet of the disclosed multilayer optical films may if desired be birefringent, e.g., uniaxially birefringent or biaxially birefringent, although in some embodiments, microlayers that are all isotropic may also be used. In some cases, each ORU may include one birefringent microlayer, and a second microlayer that is either isotropic or that has a small amount of birefringence relative to the other microlayer. In alternative cases, each ORU may include two birefringent microlayers.

Exemplary multilayer optical films are composed of polymer materials and may be fabricated using coextruding, casting, and orienting processes. Reference is made to U.S. Pat. No. 5,882,774 (Jonza et al.) "Optical Film", U.S. Pat. No. 6,179,949 (Merrill et al.) "Optical Film and Process for Manufacture Thereof", U.S. Pat. No. 6,783,349 (Neavin et al.) "Apparatus for Making Multilayer Optical Films", and U.S. Patent Application 61/332,401 entitled "Feedblock for Manufacturing Multilayer Polymeric Films", filed May 7, 2010. The multilayer optical film may be formed by coextrusion of the polymers as described in any of the aforementioned references. The polymers of the various layers may be chosen to have similar rheological properties, e.g., melt viscosities, so that they can be co-extruded without significant flow disturbances. Extrusion conditions are chosen to adequately feed, melt, mix, and pump the respective polymers as feed streams or melt streams in a continuous and stable manner. Temperatures used to form and maintain each of the melt streams may be chosen to be within a range that avoids freezing, crystallization, or unduly high pressure drops at the low end of the temperature range, and that avoids material degradation at the high end of the range.

In brief summary, the fabrication method can include: (a) providing at least a first and a second stream of resin corresponding to the first and second polymers to be used in the finished film; (b) dividing the first and the second streams into a plurality of layers using a suitable feedblock, such as one that includes: (i) a gradient plate comprising first and second flow channels, where the first channel has a cross-sectional area that changes from a first position to a second position along the flow channel, (ii) a feeder tube plate having a first plurality of conduits in fluid communication with the first flow channel and a second plurality of conduits in fluid communication with the second flow channel, each conduit feeding its own respective slot die, each conduit having a first end and a second end, the first end of the conduits being in fluid communication with the flow channels, and the second end of the conduits being in fluid communication with the slot die, and (iii) optionally, an axial rod heater located proximal to said conduits; (c) passing the composite stream through an extrusion die to form a multilayer web in which each layer is generally parallel to the major surface of adjacent layers; and (d) casting the multilayer web onto a chill roll, sometimes referred to as a casting wheel or casting drum, to form a cast multilayer film. This cast film may have the same number of layers as the finished film, but the layers of the cast film are typically much thicker than those of the finished film. Furthermore, the layers of the cast film are typically all isotropic. A multilayer optical film with controlled low frequency variations in reflectivity and transmission over a wide wavelength range can be achieved by the thermal zone control of the axial rod heater, see e.g. U.S. Pat. No. 6,783,349 (Neavin et al.).

In some cases, the fabrication equipment may employ one or more layer multipliers to multiply the number of layers in the finished film. In other embodiments, the films can be manufactured without the use of any layer multipliers. Although layer multipliers greatly simplify the generation of a large number of optical layers, they may impart distortions to each resultant packet of layers that are not identical for each packet. For this reason, any adjustment in the layer thickness profile of the layers generated in the feedblock is not the same for each packet, i.e., all packets cannot be simultaneously optimized to produce a uniform smooth spectrum free of spectral disruptions. Thus, an optimum profile, for low transmitted and reflected color, can be difficult to make using multi-packet films manufactured using multipliers. If the number of layers in a single packet generated directly in a feedblock do not provide sufficient reflectivity, then two or more such films can be attached to increase the reflectivity. Further discussion of layer thickness control, so as to provide smooth spectral reflectivity and transmission for low color films, is provided in PCT publication WO 2008/144656 (Weber et al.).

If the optical thicknesses of all of the microlayers in a given multilayer film were designed to be the same, the film would provide high reflectivity over only a narrow band of wavelengths. Such a film would appear highly colored if the band were located somewhere in the visible spectrum, and the color would change as a function of angle. In the context of display and lighting applications, films that exhibit noticeable colors are generally avoided, although in some cases it may be beneficial for a given optical film to introduce a small amount of color to correct for color imbalances elsewhere in the system. Exemplary multilayer optical film bodies are provided with broad band reflectivity and transmission, e.g. over the entire visible spectrum, by tailoring the microlayers—or more precisely, the optical repeat units (ORUs), which in many (but not all) embodiments correspond to pairs of adjacent microlayers—to have a range of optical thicknesses. Typically, the microlayers are arranged along the z-axis or thickness direction of the film from a thinnest ORU on one side of the film or packet to a thickest ORU on the other side, with the thinnest ORU reflecting the shortest wavelengths in the reflection band and the thickest ORU reflecting the longest wavelengths.

After the multilayer web is cooled on the chill roll, it can be drawn or stretched to produce a finished or near-finished multilayer optical film. The drawing or stretching accomplishes two goals: it thins the layers to their desired final thicknesses, and it may orient the layers such that at least some of the layers become birefringent. The orientation or stretching can be accomplished along the cross-web direction (e.g. via a tenter), along the down-web direction (e.g. via a length orienter), or any combination thereof, whether simultaneously or sequentially. If stretched along only one direction, the stretch can be "unconstrained" (wherein the film is allowed to dimensionally relax in the in-plane direction perpendicular to the stretch direction) or "constrained" (wherein the film is constrained and thus not allowed to dimensionally relax in the in-plane direction perpendicular to the stretch direction). If stretched along both in-plane directions, the stretch can be symmetric, i.e., equal along the orthogonal in-plane directions, or asymmetric. Alternatively, the film may be stretched in a batch process. In any case, subsequent or concurrent draw reduction, stress or strain equilibration, heat setting, and other processing operations can also be applied to the film.

In reference to traditional polarizing films, light can be considered to be polarized in two orthogonal planes, where the electric vector of the light, which is transverse to the propagation of the light, lies within a particular plane of polarization. In turn, the polarization state of a given light ray can be resolved into two different polarization states: p-polarized and s-polarized light. P-pol light is polarized in the plane of incidence of the light ray and a given surface, where the plane of incidence is a plane containing both the local surface normal vector and the light ray propagation direction or vector.

Figure 3:
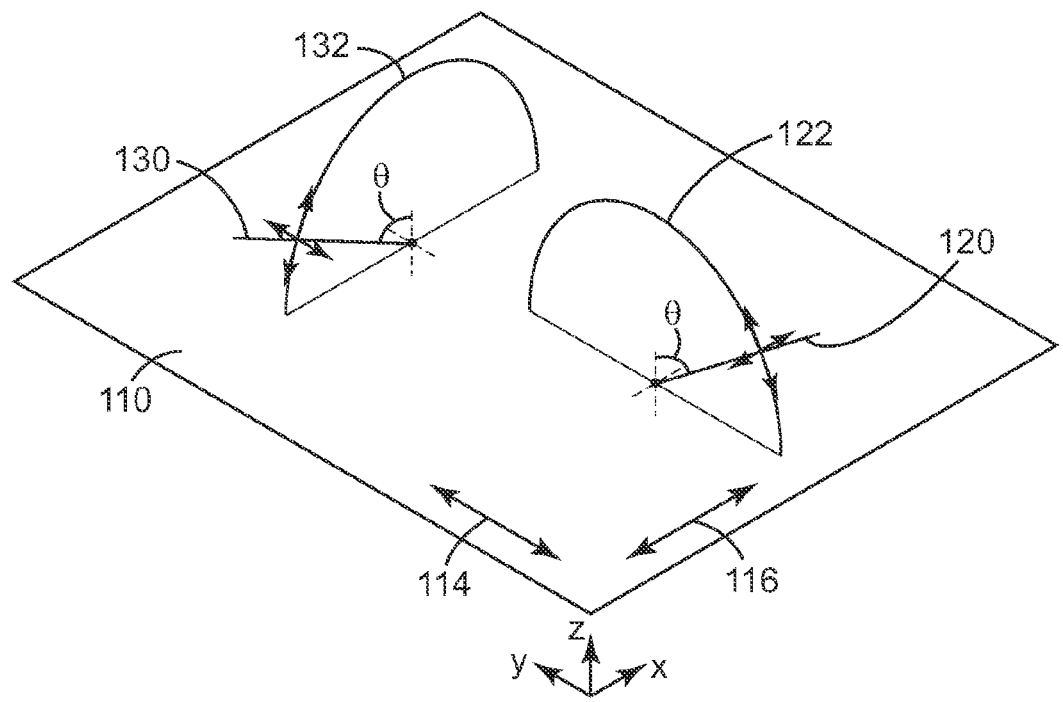
FIG. 3 is a schematic perspective view of a reflective polarizing film.

FIG. 3 is a schematic perspective view of a reflective polarizing film. FIG. 3 illustrates a light ray 130 that is incident on a polarizer 110 at an angle of incidence θ, thereby forming a plane of incidence 132. The polarizer 110 includes a pass axis 114 that is parallel to the y-axis, and a block axis 116 that is parallel to the x-axis. The plane of incidence 132 of ray 130 is parallel to the block axis 116. Ray 130 has a p-polarized component that is in the plane of incidence 132, and an s-polarized component that is orthogonal to the plane of incidence 132. The p-pol light of ray 130 will be substantially reflected by the polarizer, while the s-pol light of ray 130 is, at least in part, transmitted.

Further, FIG. 3 illustrates ray 120 that is incident on polarizer 100 in a plane of incidence 122 that is parallel to the pass axis 114 of the polarizer 110. As a result, assuming that the polarizer 110 is a perfect polarizer that has a reflectance of 100% at all angles of incident light for light polarized in the block axis and 0% at all angles of incident light for light polarized in the pass axis, the polarizer transmits s-pol light of ray 130 and the p-pol light of ray 120, while reflecting the p-pol light of ray 130 and the s-pol light of ray 120. In other words, the polarizer 110 will transmit a combination of p- and s-pol light. The amount of transmission and reflection of p- and s-pol light will depend on the characteristics of the polarizer as is further described herein.

Figure 4:
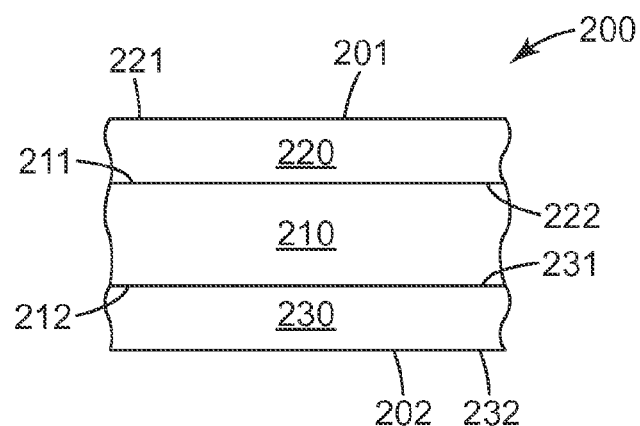
FIG. 4 is a schematic cross-sectional view of a broadband partial reflector.

FIG. 4 is a schematic cross-sectional view of a broadband partial reflector 200. A broadband partial reflector 200 includes a multilayer polymeric optical film 200 having a total number of optical repeating units that monotonically increases in thickness value from a first side 201 to a second side 202 of the multilayer polymeric optical film 200. In many embodiments, the total number of optical repeating units is in a range from 50 to 1000. In many embodiments, the broadband partial reflector 200 reflects 10-90% of visible or IR light over a band of at least 100 nm width or over a band of at least 200 nm width or over a band of at least 300 nm width.

A baseline optical repeating unit thickness profile defined by a first plurality of optical repeating units 210 and having a first average slope. The first plurality of optical repeating units 210 are defined between a first layer 211 and a final layer 212.

A first apodized thickness profile of the multilayer polymeric optical film defined by a second plurality of optical repeating units 220 and having a second average slope being at least 5 times greater than the first average slope. In many embodiments, the second average slope is at least 10 times greater than the first average slope. The second plurality of optical repeating units 220 define the first side 201 of the multilayer polymeric optical film and join the first plurality of optical repeating units 210. The second plurality of optical repeating units 220 are in a range from 5-10% or 3-15% of the total number of optical repeating units, or may contain from 4 to 20 optical repeating units. The second plurality of optical repeating units 220 are defined between a first layer 221 and a final layer 222. The final layer 222 of the second plurality of optical repeating units 220 is adjacent to and in contact with the first layer 211 of the first plurality of optical repeating units 210.

In many embodiments the broadband partial reflector 200 includes a second apodized thickness profile. The second apodized thickness profile of the multilayer polymeric optical film 200 is defined by a third plurality of optical repeating units 230 and has a third average slope being at least 5 times greater than the first average slope. In many embodiments, the third average slope is at least 10 times greater than the first average slope. The third plurality of optical repeating units 230 define the second side 202 of the multilayer polymeric optical film 200 and join the first plurality of optical repeating units 210. The third plurality of optical repeating units 230 are in a range from 5-10% or 3-15% of the total number of optical repeating units, or may contain from 4 to 20 optical repeating units. The third plurality of optical repeating units 230 are defined between a first layer 231 and a final layer 232. The first layer 231 of the third plurality of optical repeating units 230 is adjacent to and in contact with the final layer 212 of the first plurality of optical repeating units 210.

In many embodiments, the second plurality of optical repeating units 220 (i.e., first apodized thickness profile) increase in thickness from the first layer 221 and a final layer 222 in a range from 1.1× to 2×. In many embodiments, the third plurality of optical repeating units 230 (i.e., second apodized thickness profile) increase in thickness from the first layer 231 and a final layer 232 in a range from 1.2× to 2× (see FIG. 5 open circles). In many embodiments, the first apodized thickness profile exponentially deviates from the baseline optical repeating unit thickness profile. In many embodiments, the second apodized thickness profile exponentially deviates from the baseline optical repeating unit thickness profile. The first apodized thickness profile can have a first layer 221 thickness that is at least 15% thinner or at least 25% thinner than any of the first plurality of optical repeating units 210. The second apodized thickness profile has a final layer thickness 232 that is at least 15% thicker or at least 25% thicker than any of the first plurality of optical repeating units 210.

In many embodiments, the broadband partial reflector 200 includes an optically thick layer (see FIG. 2 element 112) that is optically coupled to the first side 201 or second side 202. The optically thick layer is at least 10× thicker than at least one of the first plurality of optical repeating units 210. In some embodiments the broadband partial reflector 200 includes an antireflection layer disposed on the first side 201 and/or the second side 202.

At least one difference between vacuum deposited stack designs and coextruded polymeric multilayer stack designs is the shape of the layer profile distribution. With vacuum deposited films, the desired spectrum is achieved by individually adjusting the thickness of every layer in the stack so it conforms to a computer optimized stack design. In this manner, issues such as spectral ripple are routinely minimized. Adjacent layers sometimes differ in thickness by a factor of 10, with thickness values often ranging from about 0.05λ to 1.0λ. With coextruded polymeric film stacks, on-line monitoring and control of individual layers in this manner is not yet a viable option with this technology. As a result, spectral shape is controlled mainly by the shape of a continuous and smoothly varying layer thickness profile, such as profile 5A in FIG. 5. Such profiles are not restricted to polymeric film stacks, and the apodizing profiles disclosed herein can be applied to any stack that utilizes layer thickness profiles that are graded from thin to thick layers in a substantially monotonic fashion.

One should also note that the classic examples of apodized stacks are not broadband reflectors but are stacks that are centered, i.e. tuned, for one (i.e., a single) wavelength. In such a stack, all optical repeating units have substantially the same thickness value. For those stacks, there is no "in-band" ripple, only side-band ripple. Furthermore, the apodization profile for those stacks generally extends through much or sometimes all of the layers of the stack and typically use profiles of index change, not profiles of thickness change. Common examples can be found in the fiber optic industry where the "stack" is a modulated index profile along the length of the fiber. Some apodization profiles are Cosine, Guassian, Quintic, Septic or Sinc function index profiles, for example.

By broadband reflectors we mean reflectors for which the longest and shortest wavelength in the reflection band have a wavelength ratio of about 2:1 or more, although generally they can be as low as 1.5:1 and up to as large as 5:1 for polymeric reflectors. In the following, non-limiting examples are presented, which describe various embodiments of the articles and methods discussed above.

EXAMPLES

Example 1

Computer Modeled Layer Profiles and Spectra

Figure 5:
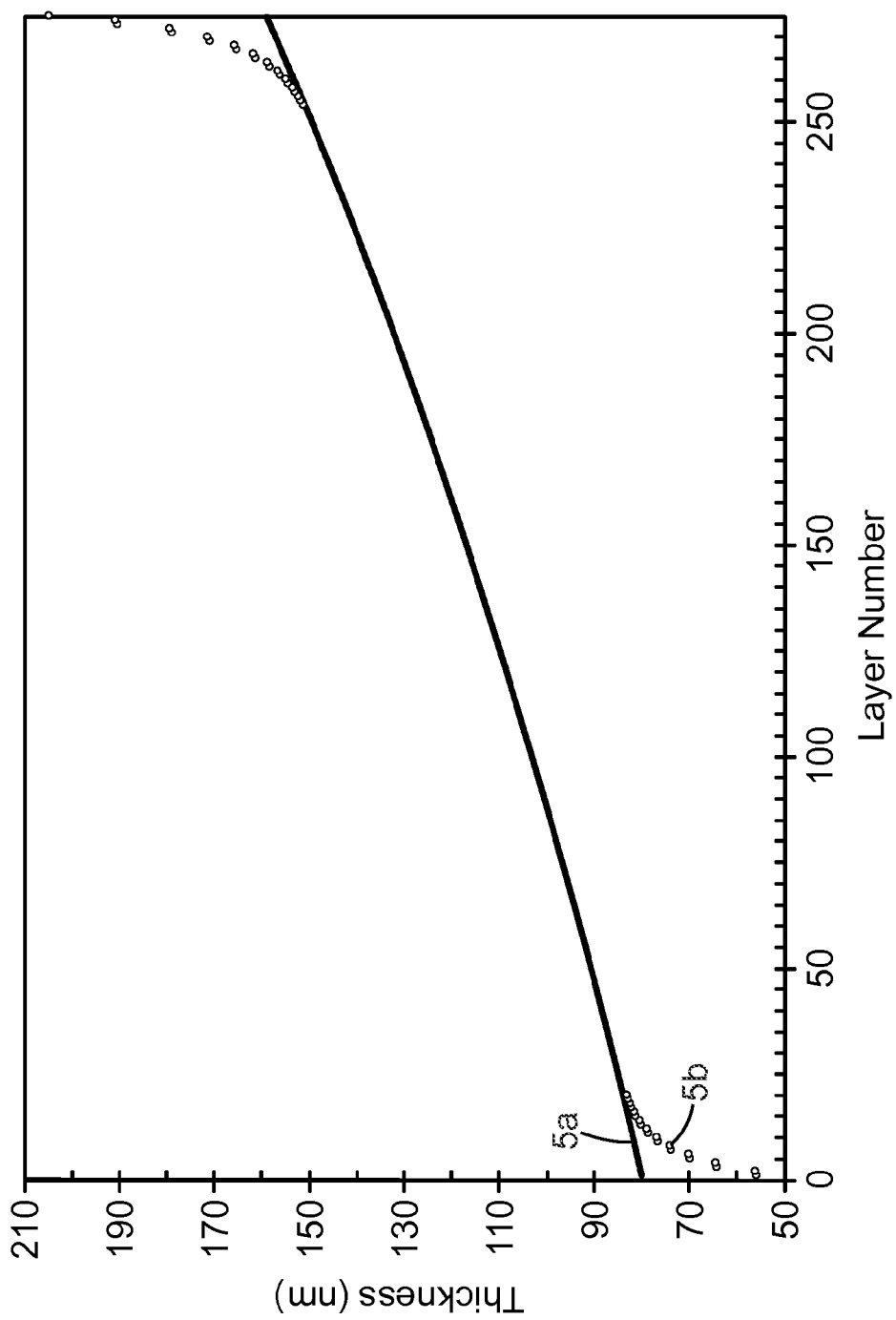
FIG. 5 is a graph of a baseline thickness profile and an apodized thickness profile that can be used to fabricate a broadband reflector of Example 1.
Figure 6:
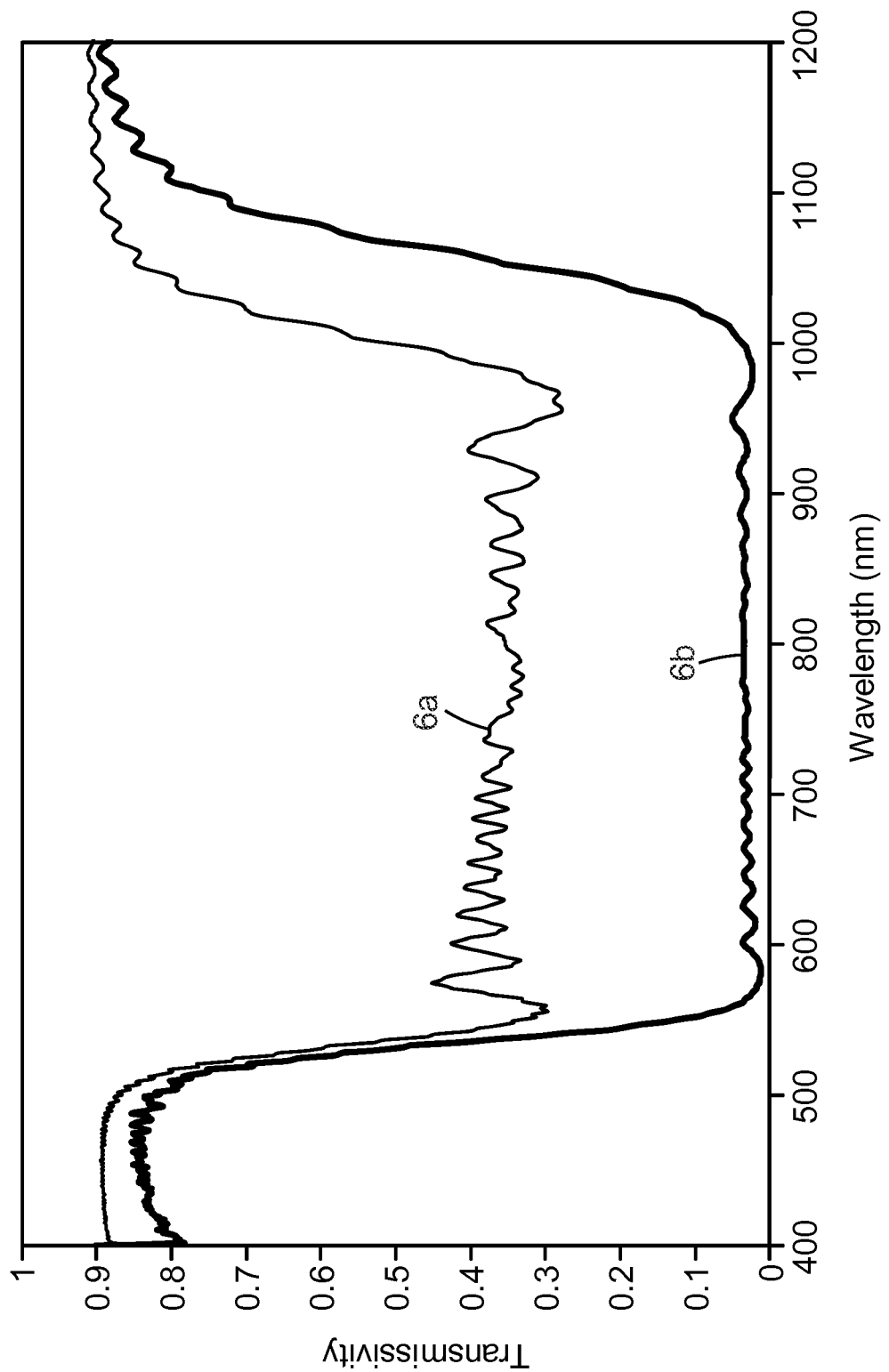
FIG. 6 is a graph of spectra modeled for a broadband reflector of Example 1 having a baseline layer thickness profile.
Figure 7:
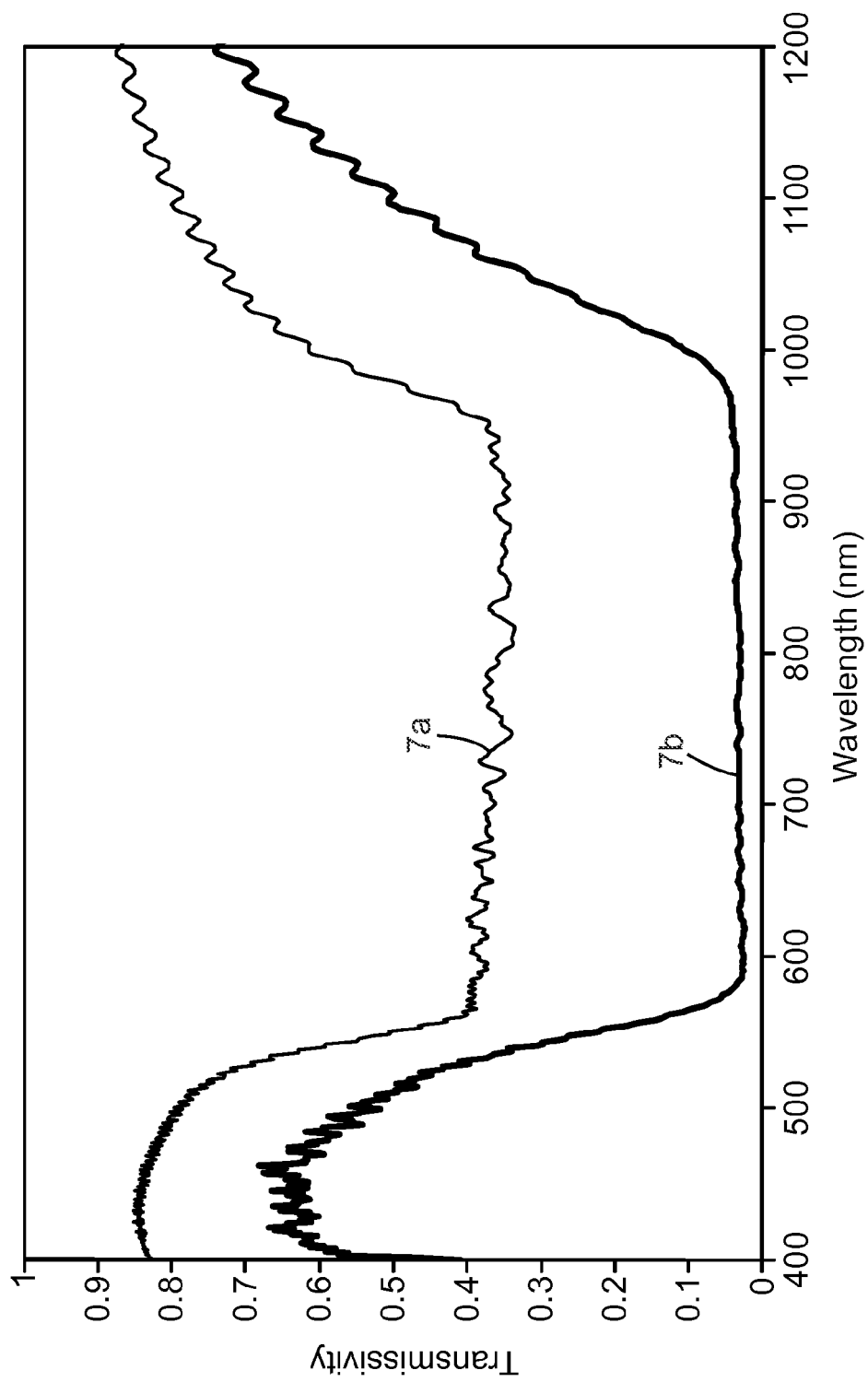
FIG. 7 is a graph of spectra modeled for a broadband reflector of Example 1 having an apodized baseline layer thickness profile.

FIG. 5 presents two distinctly different layer thickness profiles that can be used to fabricate a broadband reflector: a baseline design for a broadband reflector, and an apodized version. The apodized version shows the end sections of a baseline profile replaced with an apodizing profile (curve 5b) which terminates with a high positive slope. The baseline profile (curve 5a) was based on a simple power law profile for each layer n, from n=1 to N, where the thickness t of each layer is given by $t=T_0*(1.005)^n$ where $T_0$ is a constant scaling factor and n is the layer number. The baseline profile shown here is modified with a small adjustment that slightly increases the curvature to help adjust for index dispersion. Spectra were generated for profiles such as these using optics computer models known to those skilled in the art. According to the modeling results, the baseline layer thickness profile (curve 5a) yielded the pass spectrum 6a and block spectrum 6b, as shown in FIG. 6. The apodized baseline layer thickness profile (curve 5b) yielded the pass spectrum 7a and block spectrum 7b, as shown in FIG. 7. Notice that the in-band spectral ringing of FIG. 6 is reduced in FIG. 7 due to the apodizing profile (curve 5b).

The layer thickness values shown in FIG. 5 are equal to ½ of the physical thickness of the optical repeating units. The modeling was performed using ¼ wave optical thickness for each layer, meaning the physical thickness values were adjusted for the differing index values of the high and low index materials.

The modeled spectra of FIG. 6 were both modeled for a birefringent film stack which has the following indices of refraction: high index layers nx1=1.791, ny=1.675, nz=1.490, and low index layers nx2=ny2=nz2=1.564. This stack also included 20 micrometer thick skin layers of the low index material. This birefringent layer index set can be achieved with an asymmetrical orientation of a coPEN copolymer (90% PEN, 10% PET). The low index layers are formed from PETg GN071 which is available from Eastman Chemicals, Kingsport, Tenn. Note the in-band ringing of the spectra, especially for the pass axis spectra (curve 6a). As the reflectivity approaches 100% for the block axis (curve 6b), the oscillations on this plotted scale appear to be much smaller, but on a Log scale are still quite large. Most reflectors that have reflectance magnitudes near 99% are rarely used in transmission though, and may have little need for apodization, but this technique can be used on reflectors having any value of reflectivity.

In order to reduce the spectral oscillations, the profile of FIG. 5 was explored, with unexpected and significant success. The "apodized" profile (curve 5b) yielded the spectra of FIG. 7 which exhibit a significant reduction in spectral ringing. This apodized profile was obtained by adding an exponential tail to each end of the base profile. The exponential thickness profile was given by t=A*Exp(-n/d) where n is the layer number (from a given end), A is a fractional amplitude and d is a scalar (the 1/e value) that is a measure of how far the apodization profile extends into the stack. These values were added to the baseline layer values. $A_1$ for the apodized profile on the thin layer end was −0.3 and $A_{275}$ for the thick layer end was +0.25. In other words, layer 1 of the apodized profile was 30% thinner than layer 1 of the original baseline profile for layer 1 and layer 275 is 25% thicker than layer 275 of the original profile. Several variations (not shown) on the apodization shown in FIG. 5 were explored. Similar apodization amplitudes on either end of the stack appeared to provide similar reduction of ringing on the respective ends of the spectrum. The same was found to be true of the depth of the apodization, in term of numbers of layers.

The values for d=1/e were set to 5 for each end. The layers were numbered in pairs, i.e. the layer number n=0 was used for each layer of the first ORU, n=1 for each layer of the 2nd ORU, n=2 for each layer of the 3rd ORU and so forth. In this manner each optical repeating unit had an f-ratio of about 0.5. The alternative counting scheme wherein each layer receives a unique number n in the exponential formula was found to make very little difference in the calculated spectra.

Although this example used an exponential tail distribution on the ends of a standard layer distribution, an apodization profile of one, two, or more straight line or slightly curved line segments or other shapes would also be effective for smoothing the spectral ringing. For example, a Gaussian distribution (1/e^2) would also suppress the spectral ringing. We believe the main prerequisite is that a significant portion of layers of the apodizing profile have a significantly higher slope than the baseline profile and are graded in the directions illustrated in FIG. 5. The average slope of the first 10 layers in the thin end apodizing profile 5b of FIG. 5 is about 2.5 whereas the slope of the baseline profile is about 0.2. These are different by a factor of greater than 10. The average slope of the first 6 layers is 16 times that of the baseline slope. An average slope of the first 10 layers that is 5 times that of the average baseline slope (not shown) was also found to significantly reduce spectral ringing.

Note that the bandwidth (at 90% of baseline reflection) was slightly reduced by the apodization. This can be easily compensated, if desired, by a slight increase in the slope of the base profile which widens the final band.

Due to interference effects with the air/polymer surface reflections, laminates and protective boundary layers (PBLs) or skin layers can also play an unexpectedly important role in the optical effects which contribute to spectral ringing. The spectral ringing is greater in the absence of any optically thick layers or PBLs on the outer surfaces of the micro-layer stack. For example, note especially the pass axis spectra shown in FIG. 8, curve 8b, which was modeled without an optically thick layer or PBL on the outer surfaces of the partial reflector stack. An exception occurs though if the air interface is removed by some anti-reflection technique or coating. For example, the ringing at 60 degrees in air for p-polarized light (not shown) would then be absent. 60 degrees is near the Brewster angle and the reflection from the air/polymer interface is minimal near that angle.

Figure 8:
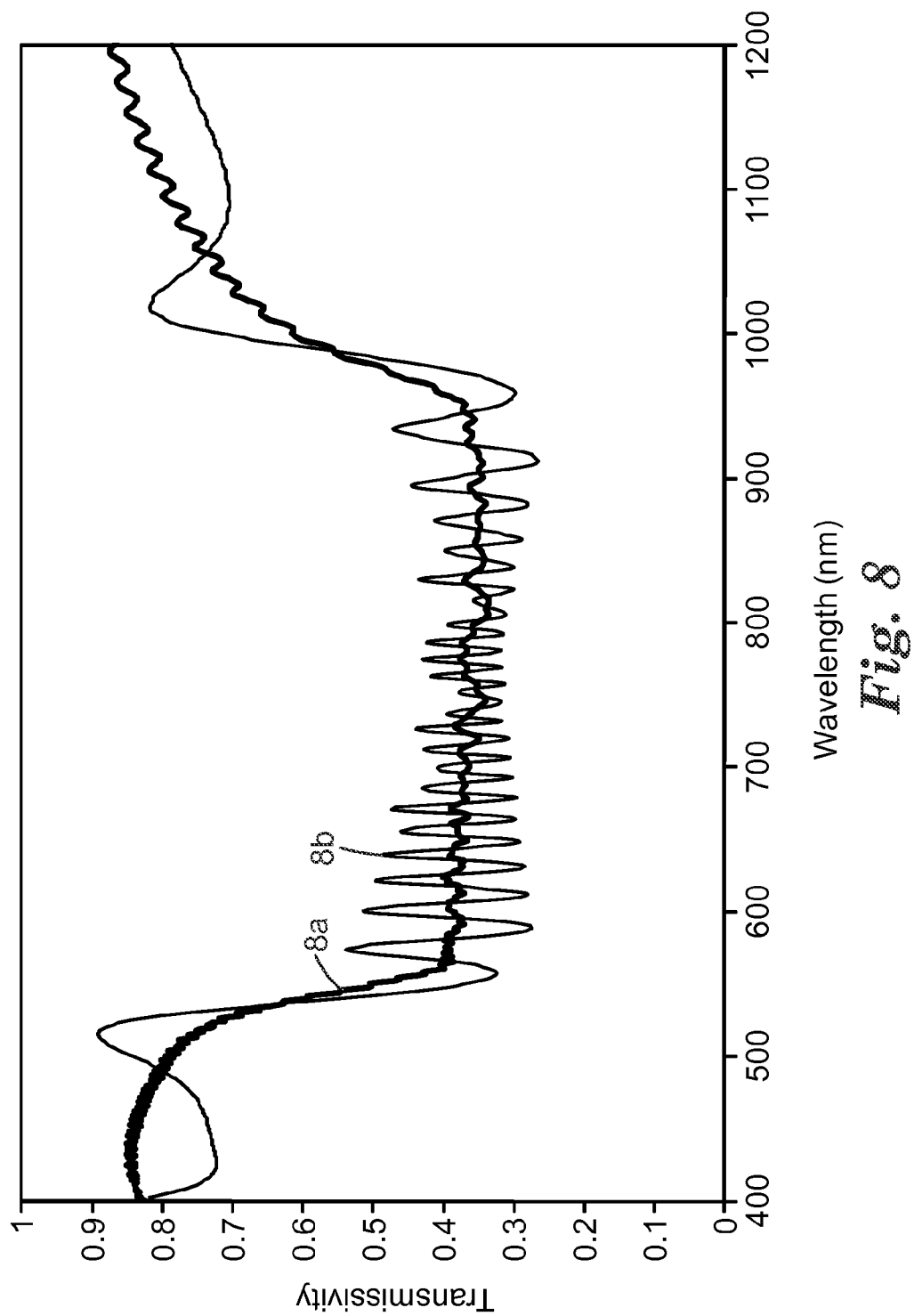
FIG. 8 is a graph of spectra modeled for a broadband reflector of Example 1 having an apodized baseline layer thickness profile with and without optically thick layers.

For the wavelengths of these spectra, modeling showed that the apodization was most effective when the skins, PBLs, or any other laminates were about several micrometers thick or greater as illustrated in FIG. 8 curve 8a. Additionally, modeling showed that if one side of the film stack had a PBL/skin layer and one did not, only the side with the PBL/skin or other laminate had reduced spectral ringing.

Modeling showed that the amplitude and depth of the apodization profile can both vary substantially and still provide a substantial reduction in ringing. For example, the apodization amplitudes in this example were 30% and 25% of the baseline layer thickness at opposite ends of the stack. These amplitudes were varied between 5% and 50% on either end and still provided about the same reduction in ringing for a 1/e depth of 7.5. Lesser amplitudes such as 5% or 10%, for example, were less effective, but still useful. The fractional amplitude A was taken to be the fractional difference of the layer thickness at the end of a straight line fit to the baseline profile compared to the thickness at the end (outer surface) of the apodizing profile.

Modeling showed that the 1/e depth of the profile can range from 3 to 10 and be quite effective, but other values are still useful. To maximally utilize the available number of layers, the depth should be kept to a minimum useful value. Modeling showed that only about 10 to 30 layers (5 to 15 ORUs) were needed on each end of a 275 layer stack to provide a beneficial reduction in ringing. In general, it was found that, comparing film stacks with about the same reflectivity, more layers are needed for both the baseline profile and the apodization profile when the index differential in the optical repeating unit is smaller. The profile shown in FIG. 5 was found to be near optimum for index differentials of about 0.1.

Example 2

High Spectral Slope

Figure 9:
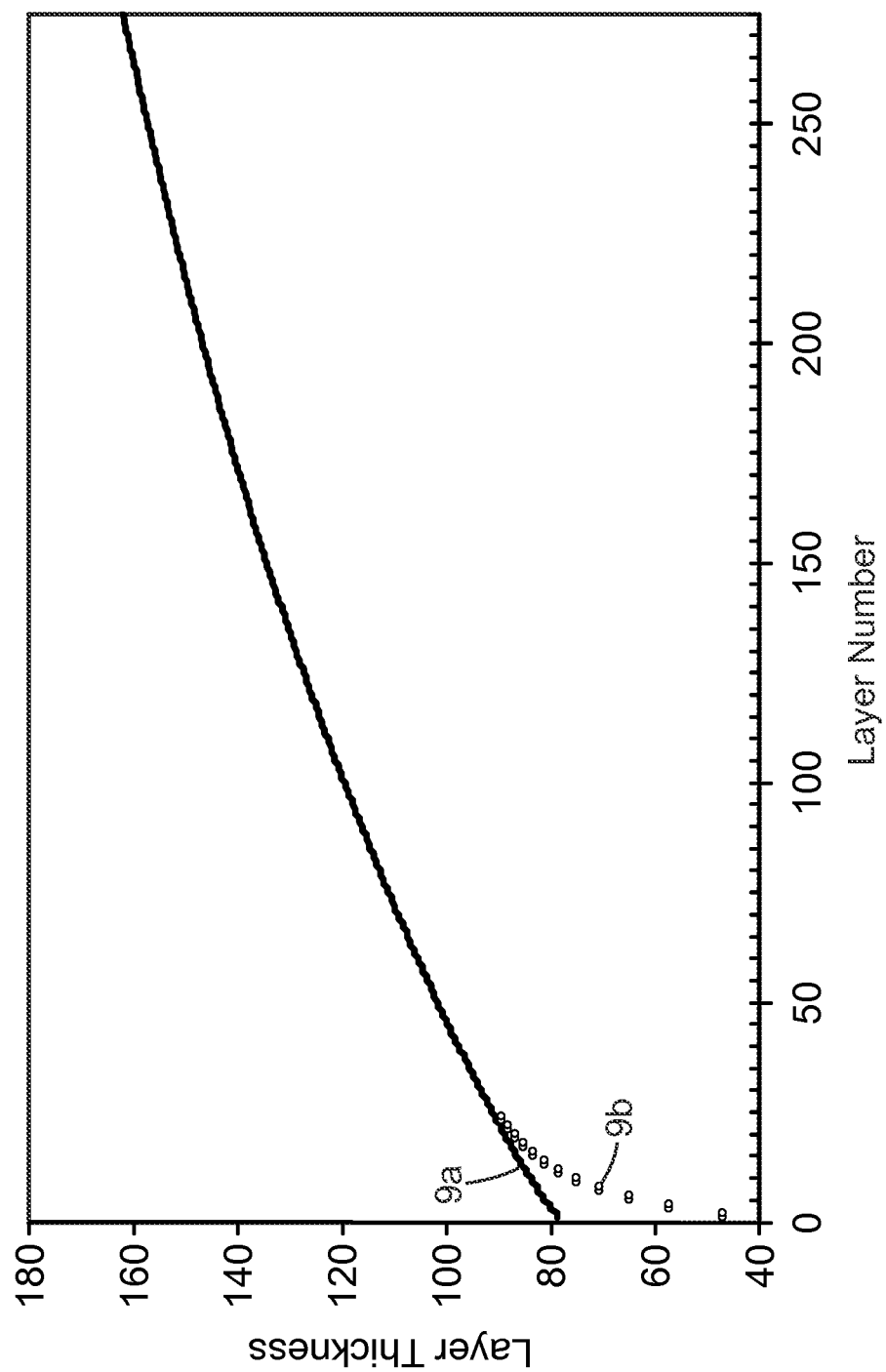
FIG. 9 is a graph of a baseline thickness profile and an apodized thickness profile that can be used to fabricate a broadband reflector with a high spectral slope.

Example 1 was for a modeled partial reflector having a substantially constant reflectivity throughout the reflection band. Apodization is also useful for stacks that produce a highly sloped spectrum. A baseline layer profile (curve 9a) having a substantially larger second derivative than the profile in FIG. 5 is shown in FIG. 9, along with an apodizing profile (curve 9b) on the thin end.

Figure 10:
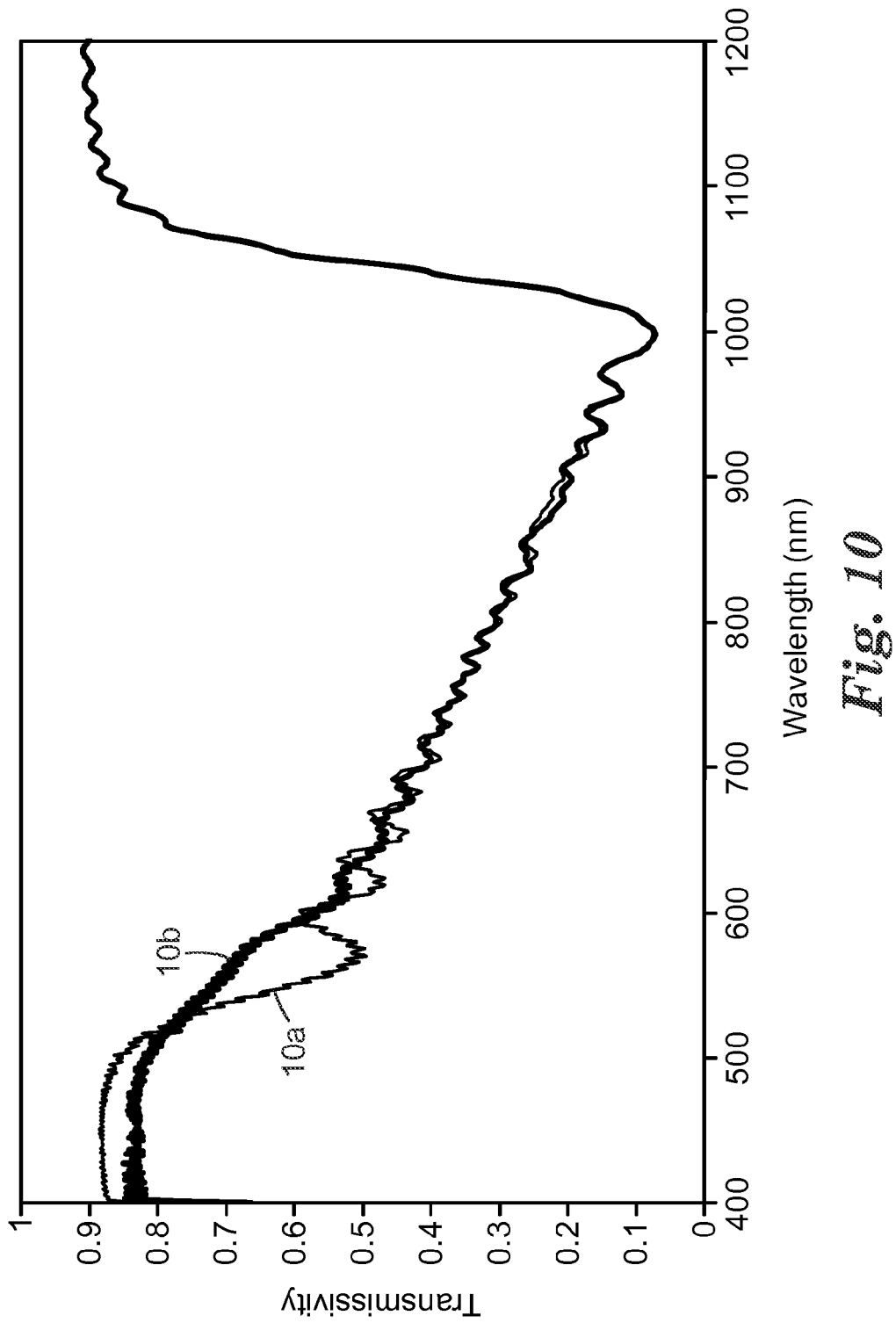
FIG. 10 is a graph of spectra modeled for a broadband reflector described in FIG. 9.

The spectra for the full baseline profile and the baseline with apodizing profile are shown as curves 10a and 10b respectively, in FIG. 10. The large spectral oscillation on the short wavelength end of the spectrum was significantly reduced with the apodizing profile curve 9b. Furthermore, with the apodizing profile, the overall spectrum was closer to a triangular shape, with the high spectral slope continuing to shorter wavelengths.

Even though the baseline profile (curve 9*a*) is substantially curved, the slope of the apodizing portion (curve 9*b*) is still much larger than that of the baseline profile. The slope of the baseline where the apodizing profile joins the baseline is about 0.47 and the average slope of the first 10 layers of the apodizing profile was about 3.37 which was a factor of about 7 times greater. The average slope of the first 20 layers of the apodizing profile was about 2.0 which was a factor of about 5 times greater. The average slope of the baseline profile is about 0.3.

Intrinsic Bandwidth Considerations

The deviation of the apodizing layer thickness profile from the baseline layer profile can also be expressed in terms of an optical coherence length which is known as the intrinsic bandwidth (IBW). The intrinsic bandwidth is a measure of the strength of coherence of adjacent layers in terms of constructive interference leading to reflectivity.

Figure 11:
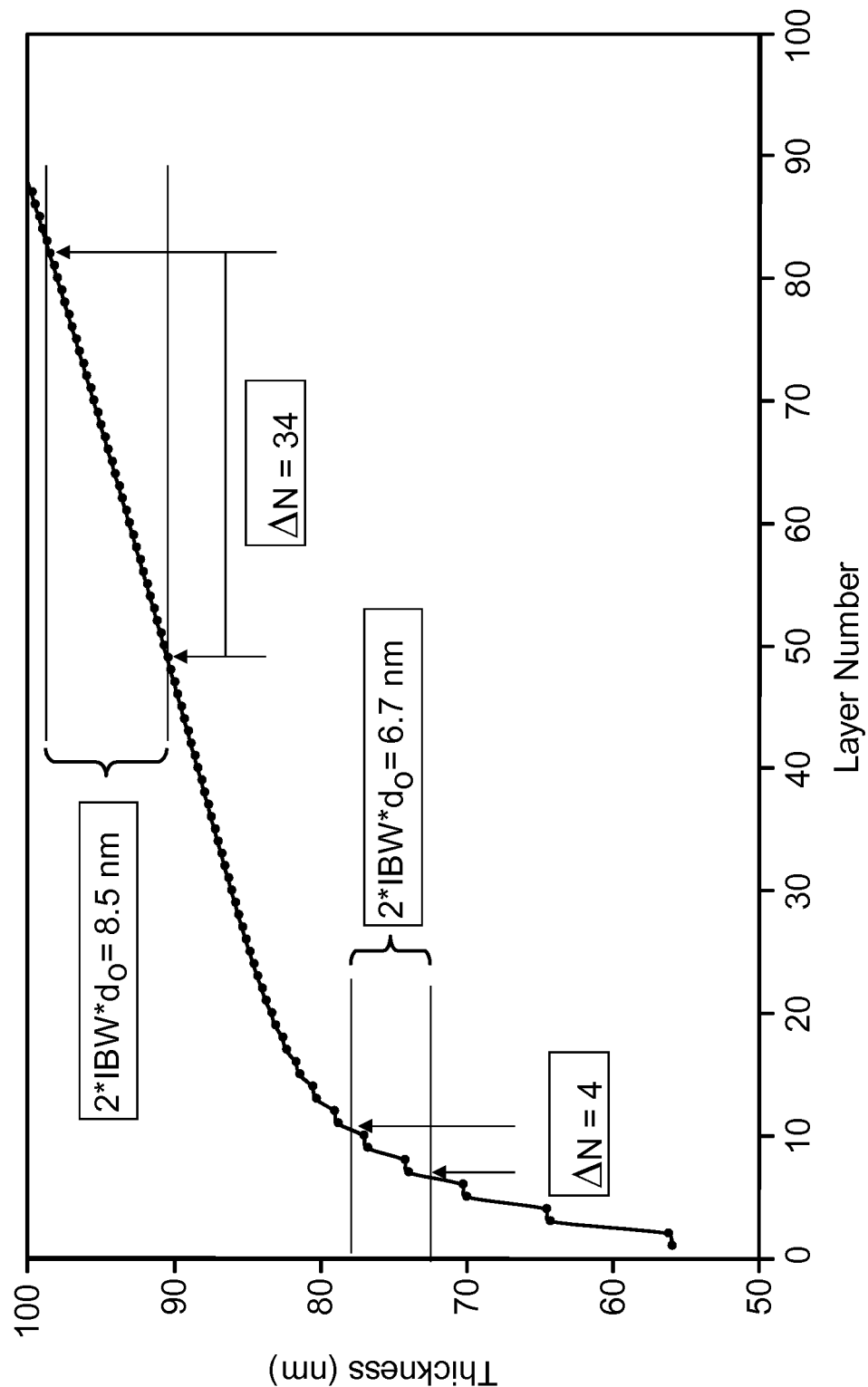
FIG. 11 is a magnified view of layer profile graph shown in FIG. 5 curve 5b.

A magnified view of the layer profile of FIG. 5 is shown in FIG. 11. The intrinsic IBW of a stack is determined solely by the indices of refraction of the materials in the stack, and the IBW is given by $$IBW = 4/\pi * \text{Sin}^{-1}[(n1-n2)/(n1+n2)],$$

which is well known in the art of thin film reflectors.

For small index differentials this formula for IBW can be simplified to first order as $$IBW = 4/\pi[(n1-n2)/(n1+n2)].$$

More generally for any polarization or angle of incidence:

$$IBW = 4/\pi * r,$$

where r is the Fresnel reflection coefficient for the interface between the material layer pairs. The expression [(n1−n2)/(n1+n2)] is recognizable as the value of r for light at normal incidence on a stack of alternating layers of index n1 and n2 where n1>n2.

The IBW is a fractional bandwidth $\Delta\lambda/\lambda o$ where $$IBW = \Delta\lambda/\lambda_0 = 4/\pi * r.$$

Since layer thickness is directly proportional to the center wavelength of reflection via the familiar relationship between wavelength λ and layer thickness d at normal incidence:

$$1/4\lambda = nd,$$

we can also write:

$$\Delta d/d_0 = IBW \text{ or } \Delta d/d_0 = 4/\pi * r$$

In this manner one can determine the approximate range of contiguous layers in a graded stack which are working in a substantially coherent manner to reflect a given wavelength $\lambda_0$ which is associated with a layer of thickness $d_0$. For a film stack with a monotonically increasing or decreasing layer profile, the layers that are strongly coupled to any given layers are those on both sides of that layer within a thickness range of +/−Δd, where Δd is given by the above formula.

Thus the range of 2*Δd can be used to determine ΔN, the number of nearby layers that work in a coherent fashion for substantial reflectivity, when the layer profile is known. ΔN can be determined only if the layer profile is given, as ΔN depends on the slope of the layer thickness profile.

The reflectivity of a stack at a certain wavelength $\lambda = 4n*d_0$, where $d_0$ is the thickness of a layer in the stack, can be shown to be proportional to the local slope of the layer profile, and is given approximately by the following formula, where r, ΔN, and IBW are determined as described above. More precisely, $d_0$ is half of the optical repeat unit of a quarterwave stack.

$$T = \text{Exp}\left[\frac{-r^2 * \Delta N * a * d_0}{\Delta d}\right]$$

The value of the factor "a" is an adjustable parameter. A value of a=2 gives appropriate values for the reflectivity. In simple cases, the ratio ΔN/Δd is 1/slope of the layer thickness profile. However, if the slope is zero, or the layer profile has short term reversals of sign in the slope, or if the layer is near the beginning or the end of the stack, the ratio ΔN/Δd must be determined by the graphical technique outlined below in association with FIG. 11. Δd is then given by the formula $\Delta d = 2*IBW*d_0$, and ΔN is all of the contiguous layers that are within a distance of this Δd on both sides of the chosen layer of thickness $d_0$. This formula is intended as a guide to determine the approximate reflectivity of stacks that have a smooth and continuous layer profile. It will not work for all cases, such as stacks with large positive and negative variations in layer thicknesses between adjacent layers or layer pairs. Also note that it does not include the reflective interface between the stack and air, or other layers laminated to the stack.

For the example profile in FIG. 11, assuming the low and high index layers are 1.564 (PETg) and 1.675 (partially oriented coPEN of Example 1), the IBW is 0.0436, or 4.36%. Twice that value is 0.0872. The range of coherent reflection on either side of a given layer of thickness $d_0$ is for layers that are +/−4.36% thicker or thinner than $d_0$. Note that in the baseline section of the stack, this translates to about 34 layers. In the highly sloped region of the apodization section, only 2 to 4 layers provide constructive interference in a substantially coherent fashion.

The magnitude of the deviation of the apodizing profile from that of the baseline profile can be expressed in terms of the IBW. This is useful since the IBW is related to the index differential in the optical repeat unit of the stack. In general, the fractional amplitude A of the apodizing profile can be in the range of 3 to 10 IBWs or even greater. The amplitude of the apodizing profile in FIG. 11 is about 7 IBWs.

In order to produce a broadband reflector with controlled color, a layer profile can be monotonically increasing or decreasing in thickness, with minimal disruptions. The monotonic restriction applies to all layers of thickness that apply to the broadband wavelength range of interest. Layer thickness anomalies should be on the order of +/−1 IBW in order to create a smoothly varying spectrum.

Monotonically Varying Layer Thickness of an Optical Repeating Unit along a Multilayer Film.

The thickness of the optical repeating unit shows a consistent trend of increasing along the thickness of the multilayer film (e.g., the thickness of the optical repeating unit does not show an increasing trend along part of the thickness of the multilayer film and a decreasing trend along another part of the multilayer film thickness). These trends are independent of layer-to-layer thickness errors, which may have a statistical variance with a 1-sigma value as large as 2% or more. In addition, a local disruption in the optical repeating unit thickness, such as those that can be noted in FIGS. 12, 14 and 16 may not be strictly monotonic by the mathematical definition, but the magnitude of the local deviations of layer thickness from a monotonic and smoothly varying layer profile should be kept to a minimum.

The intrinsic bandwidth relationship provides insight into the necessary limits of local disruptions in the layer profile and to required magnitude of the apodization profile. A localized layer profile disruption in the interior of the profile that is greater than about +/−1 IBW can cause a rather significant oscillation in the spectrum of the stack. Such local thickness deviations are preferably less than about +/−0.5*IBW, or less than +/−0.25*IBW.

Alternative Apodizing Profiles

The exponential deviation from the baseline profile provides a good apodization for a broadband stack. The exponential profile has a continuously changing slope and the derivative of the slope is also an exponential. Other profiles are also effective. In general, any continuous and quickly changing slope near the end of a baseline profile, provides the desired reduction in spectral ringing. The first derivative, or slope, of the apodization layer profile at the end layer is desirably much higher, on the order of 5, 7 or 10 times higher, than the slope of the baseline profile where the apodization profile joins the baseline profile. The number of layers in one apodization profile can be about 3%, 5%, 10% or 15% of the total number of layers in the stack, where the stack is composed of a continuous profile of optical repeating units and is generally increasing in thickness from one end to another. Small deviations of some layers from this ideal profile can be tolerated, but local deviations of more than one intrinsic bandwidth, with both positive and negative slopes, can cause significant disruptions of the spectral response at localized wavelengths.

The average slope of the apodization layer profile, measured from the end layer to a layer whose number is 5% of the total number of layers, can be about 4 or 5 times higher than the average slope of the baseline profile and give effective spectral smoothing.

Example 3

Polymeric Apodized on the Red Spectral Side

Using the feedblock method described in U.S. Pat. No. 6,783,349, a 275 microlayer packet of alternating low and high index polymer layers was coextruded as a cast web and then oriented with a constrained uniaxial stretch of about 6:1 in a standard film tenter. The high index birefringent material was a 90/10 coPEN (90% naphthalate units to 10% teraphthalate units).

The stretching temperatures and rates were adjusted so as to obtain the following set of indices for the birefringent high index 90/10 coPEN polymer: nx≈1.82, ny≈1.62, nz≈1.50, where x is the transverse tenter-stretched direction. The low index material was NEOSTAR FN007 copolyester ether elastomer, available from Eastman Chemical (Kingport, Tenn.), which has an index of about 1.505. All indices were measured at 633 nm.

Figure 12:
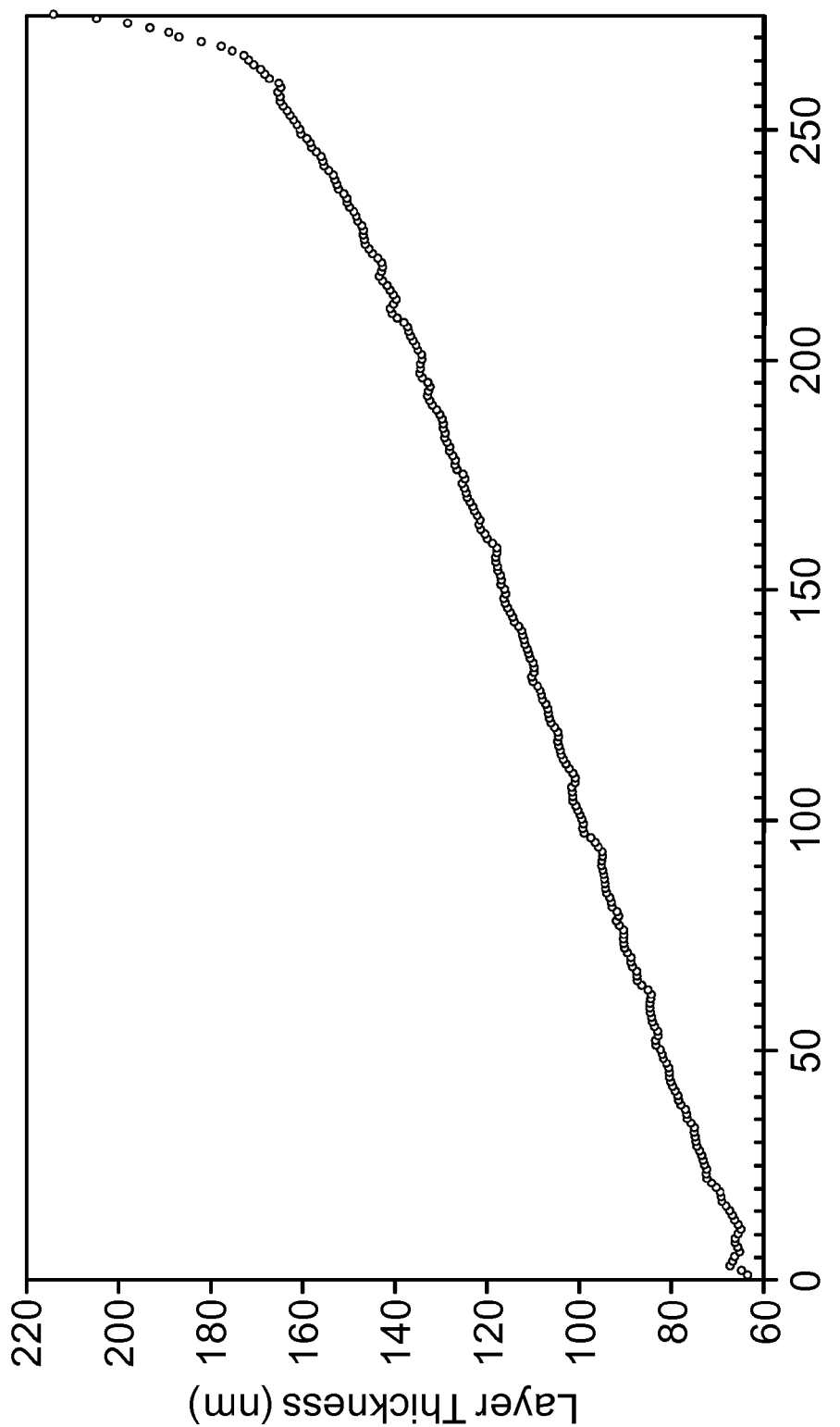
FIG. 12 is a graph of an apodized thickness profile for a first polymeric film.

The layer thickness profile of the 275 microlayers of the oriented film was measured using Atomic Force Microscopy (AFM), and is shown in FIG. 12. After orientation, a 100 micrometer thick film of clear PET was laminated to the thick layer side of the film stack using a 50 micrometer thick layer of clear pressure sensitive adhesive. The film was so laminated to suppress extraneous spectral ringing which can be caused by interference of light reflected from the front and back air/polymer interfaces of the film. The resulting spectrum for the y-axis of the film, measured at normal incidence with light polarized parallel to the y-axis of the film is shown in FIG. 13.

Layer profile FIG. 12 included an apodizing profile on the thick end of the stack. The average slope of the baseline profile was about 0.37. The average slope for the outer 10 layers of the apodizing profile was about 4.3, the average slope for the last 14 layers was about 3.3 and the average slope for the last 20 layers was about 2.3. When divided by the slope of the baseline profile, these yield ratios of about 12, 9 and 6 respectively. The equation for the straight line fit of the base profile was t=0.3728*n+62.41. At the maximum value of n=275, the baseline thickness value was 165 nm. Layer number 275 was measured to be 214 nm thick. The fractional amplitude difference A was given by A=(214-165)/165≈0.3. The apodizing profile joined the baseline profile near layer number 240. Thus about 13% of the layers were utilized for the apodization profile.

Figure 13:
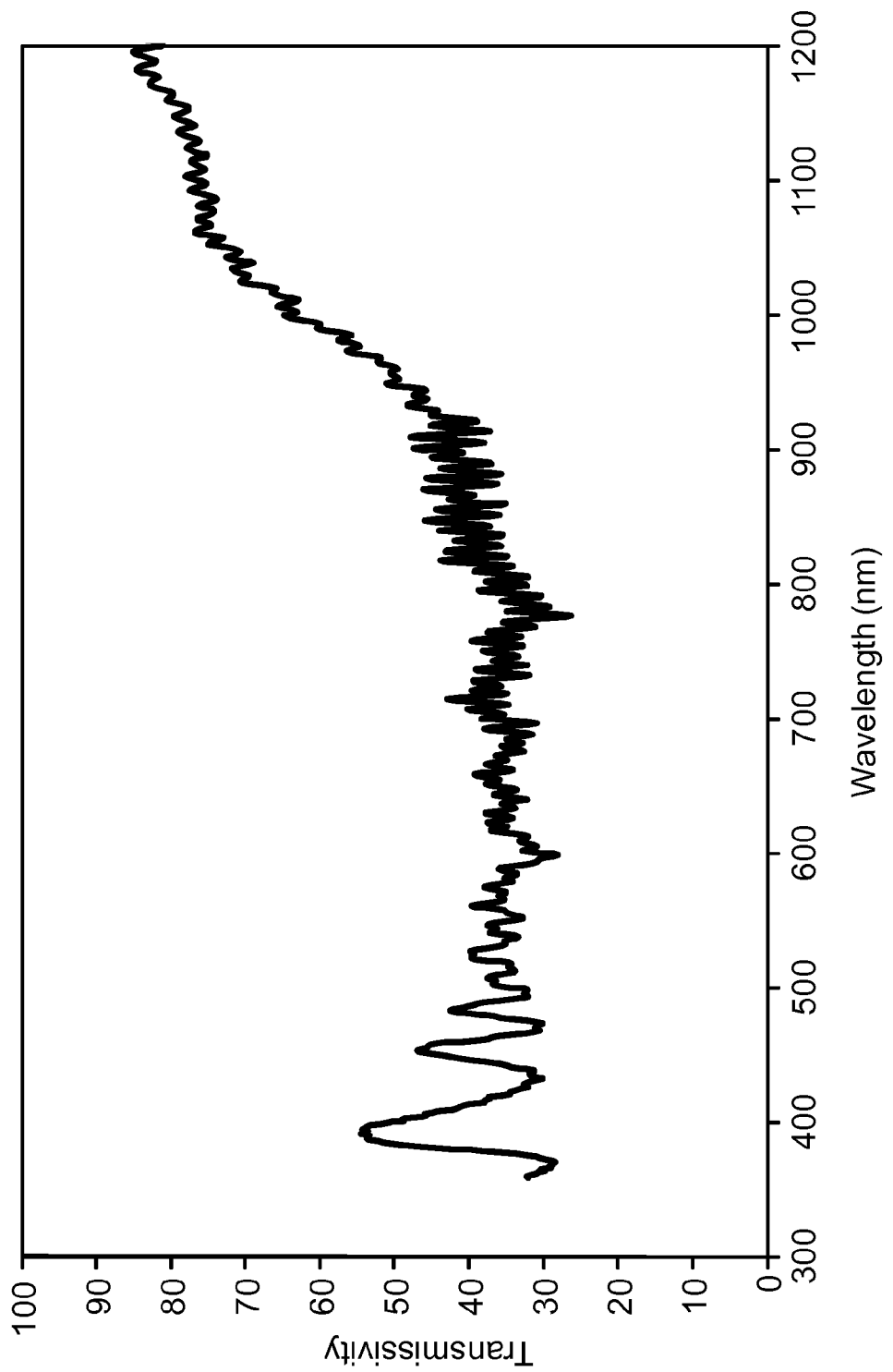
FIG. 13 is a graph of spectra measured for a broadband reflector described in FIG. 12.

The difference in the blue and red ends of the spectrum are readily apparent in FIG. 13. The large oscillations in the transmission spectrum in the blue were absent at the long wavelength end of the spectrum due to the use of the apodizing layer profile. The overall shape of the spectrum could be changed, if desired, by adjusting the shape of the baseline layer profile as illustrated by Example 2.

Example 4

Polymeric Apodized on the Blue Spectral Side

Using the feedblock method described in U.S. Patent Application 61/332,401 filed May 7, 2010, two 275 layer packets of alternating low and high index polymer layers were coextruded as one cast web and then stretched in a sequential biaxial orientation film line. The multilayer cast web was first stretched with a stretch ratio of about 3.5 to 1 in a length orienter and then transversely stretched in a tenter with a stretch ratio of about 6.5 to 1. The stretching temperatures were adjusted so as to obtain the following set of indices for the film: the high index layers were PEN homopolymer with nx≈1.80, ny≈1.70, nz≈1.48, where x is the more highly stretched transverse direction, and the low index material was a blend of 27% 90/10 coPEN and 73% PETg, the blend having index n≈1.584 for x, y, and z directions and showing minimal birefringence compared to the PEN layer.

After stretching, the two packets of layers were peeled apart along the interior PBLs of each stack. The two PBLs were the same material, and thus merged into one layer which in this case adhered to the thick layer side of packet #1 during the peeling process. Packet #1 was used for this example and had a skin layer of about 15 micrometers on the thin layer side and a PBL of about 5 micrometers thickness on the thick layer side.

Figure 14:
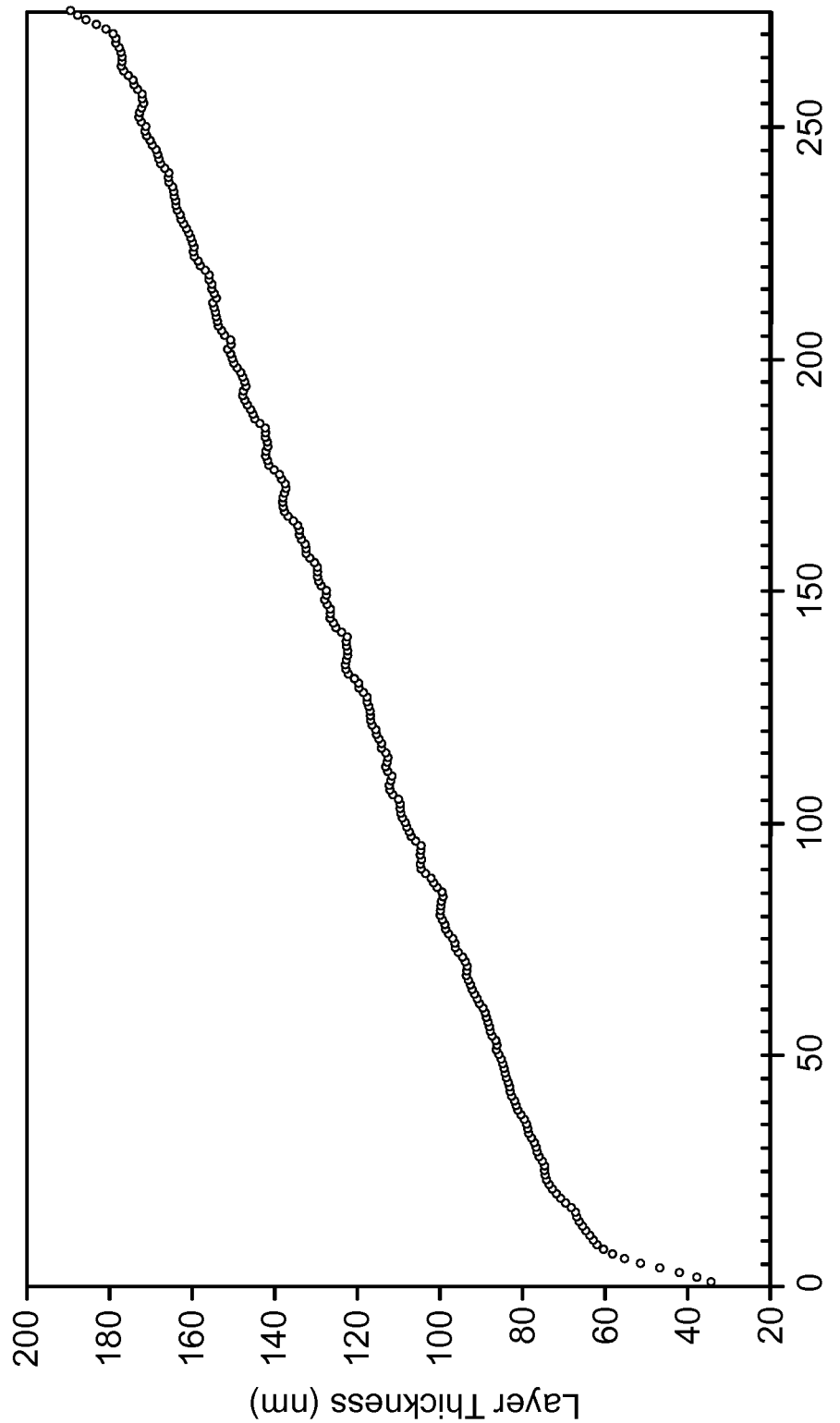
FIG. 14 is a graph of an apodized thickness profile for a second polymeric film.

The layer profile of the 275 microlayers of the oriented film packet was measured using Atomic Force Microscopy (AFM), and the layer thickness profile is shown in FIG. 14. In this example, an apodizing layer profile was applied to the thin layer end of the film stack.

The average slope of the baseline profile was about 0.43. The average slope for the first 10 layers of the stack was about 3.4, for the first 14 layers about 2.5 and the average slope for the first 20 layers was about 1.75. These yielded ratios of about 8, 6, and 4, respectively compared to the average baseline slope. The equation for the straight line fit of the base profile was t=0.427*n+64.623. The thinnest layer of the apodizing profile (layer #1 of the stack) was 35 nm. The fractional amplitude A of the apodizing layer profile was ≈(65-35)/65=0.46.

Figure 15:
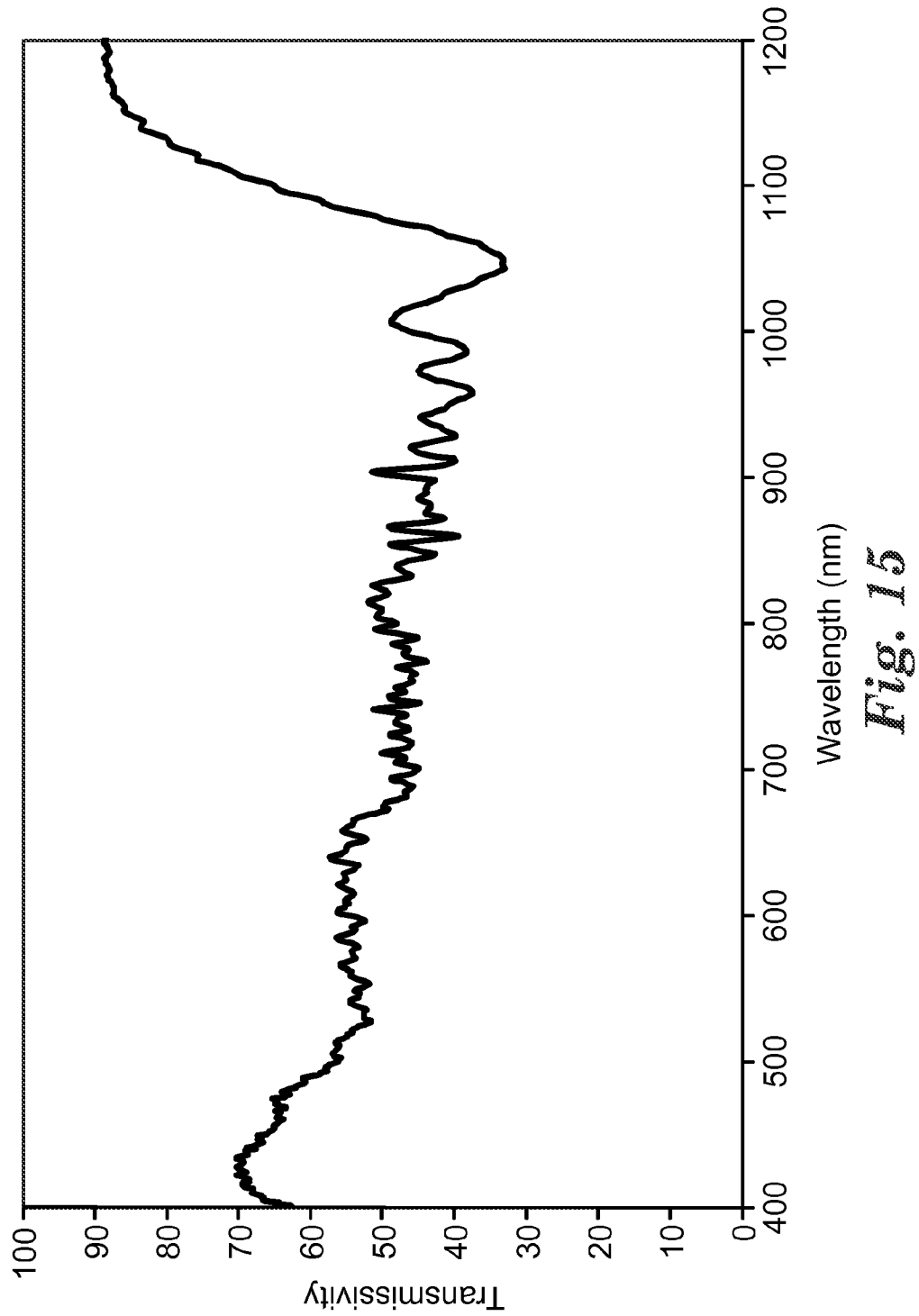
FIG. 15 is a graph of spectra measured for a broadband reflector described in FIG. 14.

After peeling the two film packets apart, a 100 micrometer thick film of clear PET was laminated to the thick layer side of packet #1 using a 50 micrometer thick layer of clear pressure sensitive adhesive. On the thin layer side of this stack, a 50 micrometer thick layer of clear pressure sensitive adhesive was applied. The resulting spectrum for the pass axis of this polarizing film, measured at normal incidence with light polarized parallel to the y-axis of the film, is shown in FIG. 15.

As expected from the modeling efforts, the ringing was substantially eliminated on the blue end of this spectrum but substantial spectral oscillations were present on the red end. The effect of the laminate on the thick layer side was mainly only a smoothing of the finer ripples caused by interference from the two air interfaces on the film. The AFM layer profile showed an increase in slope for several layers on the red end, but the profile was not deep enough nor of high enough amplitude to effectively reduce the spectral oscillation on the red end. By contrast, the spectral ringing is effectively eliminated on the thin layer side Example 5

Polymeric Film Apodized on the Blue Spectral Side

Using the feedblock method described in U.S. Patent Application 61/332,401 filed May 7, 2010, two 275 layer packets of alternating low and high index polymer layers were coextruded as cast web and then stretched in a sequential biaxial orientation film line. The multilayer cast web was first stretched with a stretch ratio of about 3.5 to 1 in a length orienter and then transversely stretched in a tenter with a stretch ratio of about 6.5 to 1. The stretching temperatures were adjusted so as to obtain the following set of indices for the film: the high index layers were PEN homopolymer with $nx \approx 1.80$, $ny \approx 1.70$, $nz \approx 1.48$, where x is the more highly stretched transverse direction, and the low index material was a blend of 27% 90/10 coPEN and 73% PETg, the blend having index $n \approx 1.584$ for x, y, and z directions and showing minimal birefringence compared to the PEN layer.

Figure 17:
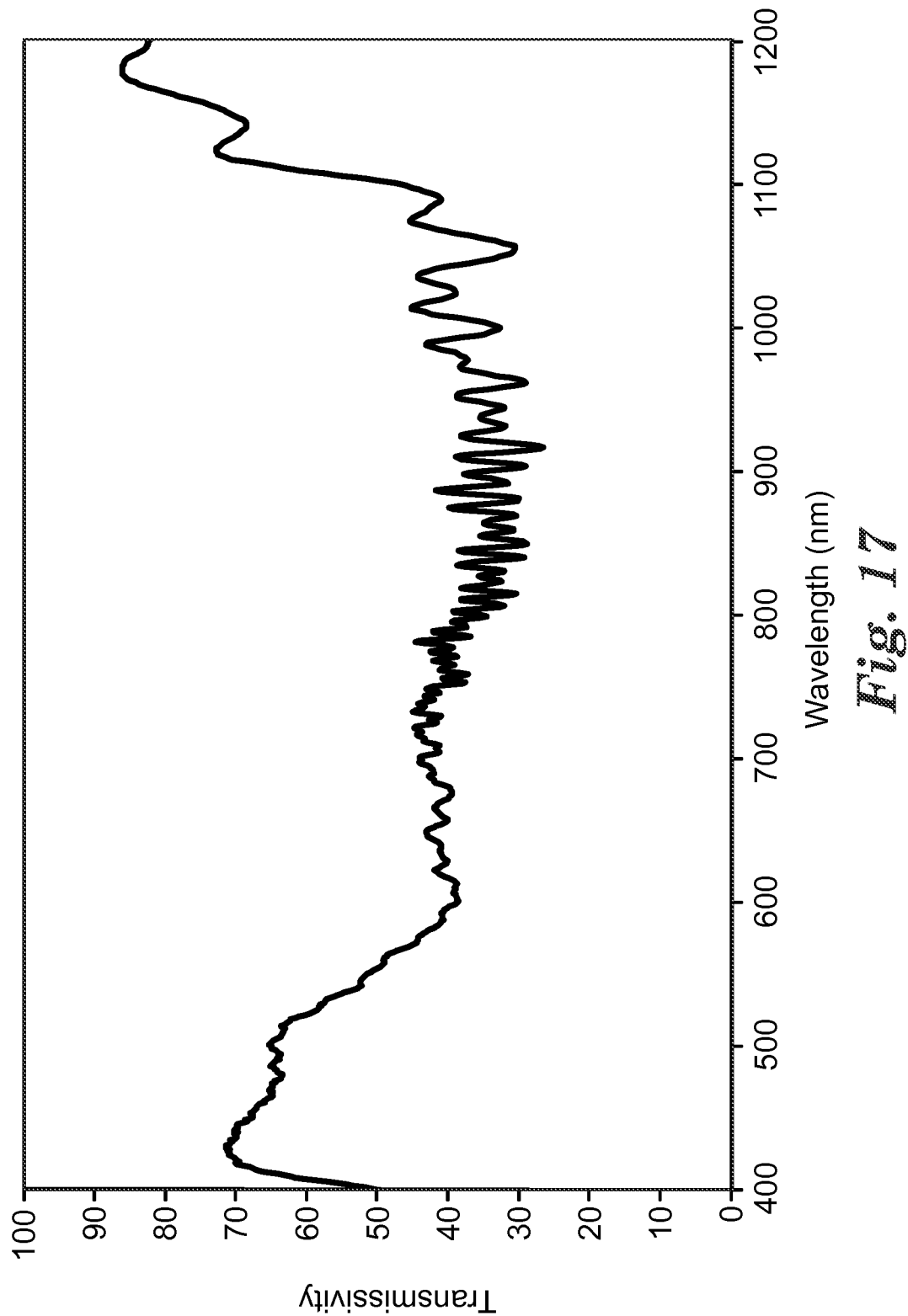
FIG. 17 is a graph of spectra measured for a broadband reflector described in FIG. 16.

After orientation, the two packets of layers were peeled apart along the interior PBLs of each stack. The two PBLs were the same material, and thus merged into one layer, which in this case adhered to the thick layer side of packet #1 during the peeling process. packet #2 was used for this Example and thus had no PBL or skin layer on the thin layer side. A layer of optically clear tape was applied to the thin layer side of packet #2 and the spectrum was measured on this laminate at normal incidence, for light polarized parallel to the y axis, and was plotted in FIG. 17. The thick layer side of this packet was in contact with the coextruded skin/PBL which was about 10 micrometers thick.

Figure 16:
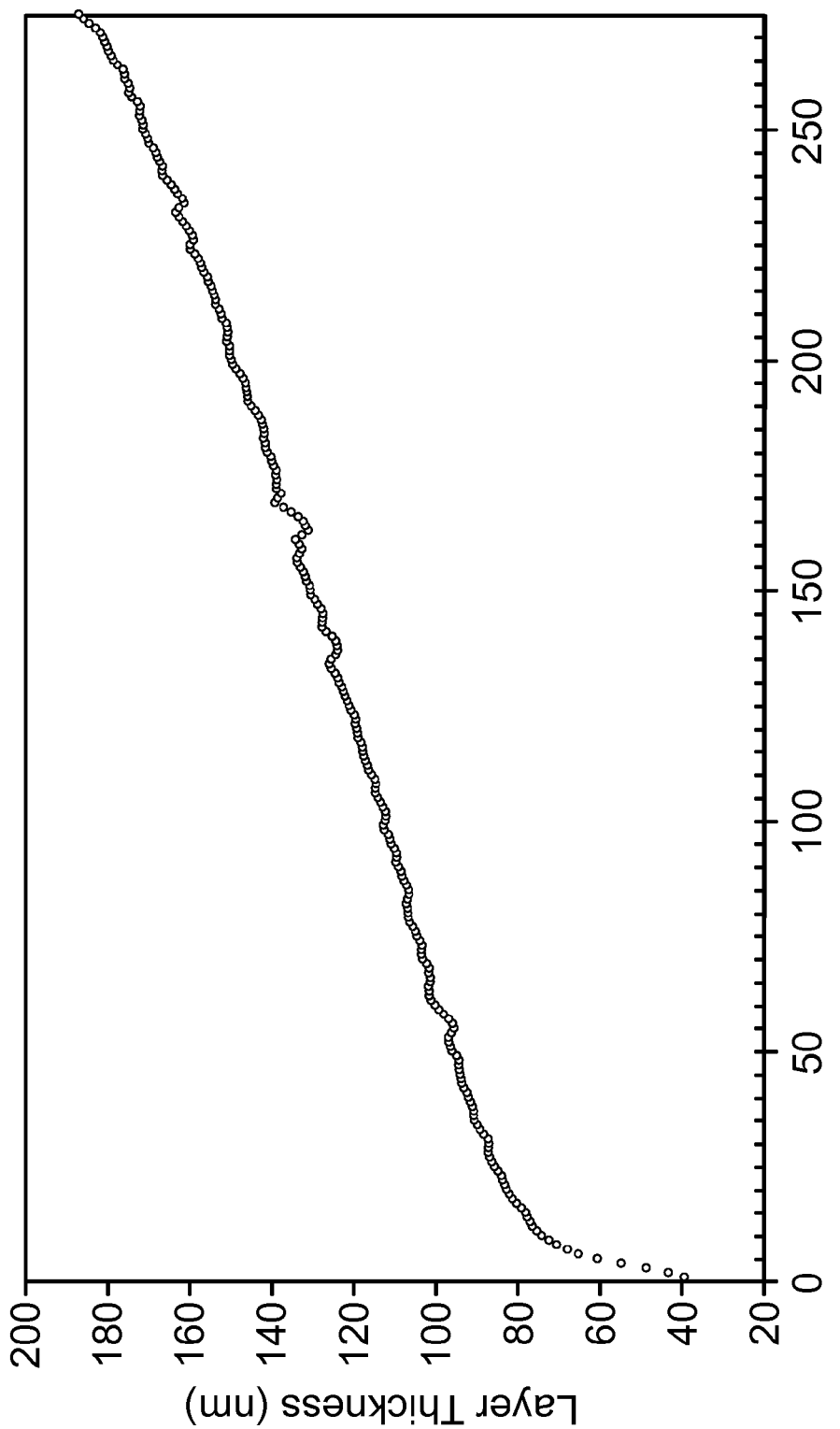
FIG. 16 is a graph of an apodized thickness profile for a third polymeric film.

The layer profile of the 275 microlayers of the oriented film packet was measured using Atomic Force Microscopy (AFM), and the layer thickness profile is shown in FIG. 16. In this example, an apodizing layer profile was applied to the thin layer end of the film stack.

The average slope of the baseline profile was about 0.37. The average slope for the first 10 layers of the stack was about 4.1, the average slope for the first 14 layers was about 3.0 and for the first 20 layers was about 2.1. These layer numbers represented 3.6%, 5.1% and 7.3% of the total layers in the stack, respectively. These numbers also yield ratios of about 11, 8, and 6, respectively, when compared to the average baseline slope. The equation for the straight line fit of the base profile was $t=0.3747*n+75.598$. The thinnest layer of the apodizing profile (layer #1 of the stack) was $\approx 40$ nm. The fractional amplitude A of the apodizing layer profile was $\approx (76-40)/76 \approx 0.47$.

As expected from the modeling efforts, the ringing was substantially eliminated on the blue end of this spectrum but substantial spectral oscillations were present on the red end. The effect of the laminate on the thick layer side was mainly only a smoothing of the finer ripples caused by interference from the two air interfaces on the film. The AFM layer profile showed an increase in slope for several layers on the red end, but the profile was not deep enough nor of high enough amplitude to effectively reduce the spectral oscillation on the red end. By contrast, the spectral ringing was effectively eliminated on the thin layer side.

The average slope for the last 10 layers on the thick layer side was about 0.86, the average slope for the last 14 layers was about 0.80, and the average slope for the last 20 layers was about 0.68. These values yielded low ratio values of 2.32, 2.16 and 1.84, when compared to the average baseline slope.

Layer number 275 was measured to be 187 nm thick. Using the equation for the straight line fit $(t=0.3747*n+75.598)$ with $n=275$ the baseline thickness was about 179 nm at layer 275. The fractional amplitude difference A was by $A=(187-179)/179 \approx 0.045$.

In general, the apodization technique describe above is very effective in eliminating the phenomenon of in-band spectral ringing (oscillation of the transmission spectrum). Improvements in extrusion equipment can provide for overall improvements in the shape of the spectral transmission curve by reducing the short term variations in the layer profiles that are evident in FIGS. 12, 14 and 16.

In other embodiments, apodized stacks are useful in cases where two or more partially reflective stacks are combined to increase the reflectivity in part or all of the wavelength range of the one of the stacks without introducing substantial disruptions in the spectrum of the combined stack. Such combined film stacks without apodization are described in PCT filed application US2011/035967 entitled "Partially Reflecting Multilayer Optical Films With Reduced Color." The film stacks described therein can benefit from the use of apodizing profiles on either the thin end or on the thick end or on both ends of each packet.

The apodizing profiles described herein are intended for broadband reflectors that are constructed with a graded layer thickness baseline profile and exhibit in-band ripple. Instead of a graded thickness apodizing profile, the apodizing function can also be achieved with a graded index profile on the ends of the baseline layer thickness profile. With a graded index profile, the ORU thickness values do not necessarily deviate from the baseline profile: the index difference Δn simply approaches zero on the end of the stack. The gradation of Δn can follow an exponential profile or other profile similar to the ones described above for thickness graded apodizing profiles. The graded index profile can be real or virtual. An example of a virtual graded index is a gradation of the f-ratio of the stack throughout the ORUs of the apodizing profile. Combinations of graded index and graded layer thickness profiles can also be used as apodizing profiles.

Thus, embodiments of APODIZED BROADBAND PARTIAL REFLECTORS are disclosed. One skilled in the art will appreciate that the optical films and film articles described herein can be practiced with embodiments other than those disclosed. The disclosed embodiments are presented for purposes of illustration and not limitation.

What is claimed is:

1. A broadband partial reflector comprising:
   a multilayer polymeric optical film having a total number of optical repeating units that monotonically increases in thickness value from a first side to a second side of the multilayer polymeric optical film, having:
   a baseline optical repeating unit thickness profile defined by a first plurality of optical repeating units and having a first average slope; and a first apodized thickness profile of the multilayer polymeric optical film defined by a second plurality of optical repeating units and having a second average slope being at least 5 times greater than the first average slope, wherein the second plurality of optical repeating units define the first side of the multilayer polymeric optical film and join the first plurality of optical repeating units, the second plurality of optical repeating units are in a range from 3-15% of the total number of optical repeating units, and wherein the first apodized thickness profile has a first layer thickness that is at least 15% thinner than any of the first plurality of optical repeating units.

2. A broadband partial reflector according to claim 1, wherein the second plurality of optical repeating units increase in thickness in a range from 1.1× to 2×.

3. A broadband partial reflector according to claim 1, wherein the total number of optical repeating units is in a range from 50 to 1000.

4. A broadband partial reflector according to claim 1, wherein the second average slope is at least 10 times greater than the first average slope.

5. A broadband partial reflector according to claim 1, wherein the first apodized thickness profile exponentially deviates from the baseline optical repeating unit thickness profile.

6. A broadband partial reflector according to claim 1, wherein the first apodized thickness profile has a first layer thickness that is at least 25% thinner than any of the first plurality of optical repeating units.

7. A broadband partial reflector according to claim 1, wherein the broadband partial reflector reflects 10-90% of visible or IR light over a range of at least 100 nm for light polarized parallel to one optical axis.

8. A broadband partial reflector according to claim 1, further comprising an optically thick layer optically coupled to the first side, wherein the optically thick layer is at least 10× thicker than at least one of the first plurality of optical repeating units.

9. A broadband partial reflector according to claim 1, further comprising an anti-reflection layer disposed on the first side.

10. A broadband partial reflector comprising:
a multilayer polymeric optical film having a total number of optical repeating units that monotonically increases in thickness value from a first side to a second side of the multilayer polymeric optical film, having:
a baseline optical repeating unit thickness profile defined by a first plurality of optical repeating units and having a first average slope;
a first apodized thickness profile of the multilayer polymeric optical film defined by a second plurality of optical repeating units and having a second average slope being at least 5 times greater than the first average slope, wherein the second plurality of optical repeating units define the first side of the multilayer polymeric optical film and join the first plurality of optical repeating units, the second plurality of optical repeating units are in a range from 5-10% of the total number of optical repeating units; and
a second apodized thickness profile of the multilayer polymeric optical film defined by a third plurality of optical repeating units and having a third average slope being at least 5 times greater than the first average slope, wherein the third plurality of optical repeating units define the second side of the multilayer polymeric optical film and join the first plurality of optical repeating units, the third plurality of optical repeating units are in a range from 5-10% of the total number of optical repeating units.

11. A broadband partial reflector according to claim 10, wherein the second plurality of optical repeating units and the third plurality of optical repeating units increase in thickness in a range from 1.1× to 2×.

12. A broadband partial reflector according to claim 10, wherein the total number of optical repeating units is in a range from 50 to 1000.

13. A broadband partial reflector according to claim 10, wherein the second average slope is at least 10 times greater than the first average slope and the third average slope is at least 10 times greater than the first average slope.

14. A broadband partial reflector according to claim 10, wherein the first apodized thickness profile and the second apodized thickness profile exponentially deviates from the baseline optical repeating unit thickness profile.

15. A broadband partial reflector according to claim 10, wherein the first apodized thickness profile has a first layer thickness that is at least 15% thinner than any of the first plurality of optical repeating units and the second apodized thickness profile has a final layer thickness that is at least 15% thicker than any of the first plurality of optical repeating units.

16. A broadband partial reflector according to claim 10, wherein the first apodized thickness profile has a first layer thickness that is at least 25% thinner than any of the first plurality of optical repeating units and the second apodized thickness profile has a final layer thickness that is at least 25% thicker than any of the first plurality of optical repeating units.

17. A broadband partial reflector according to claim 10, wherein the broadband partial reflector reflects 10-90% of visible or IR light over at least 100 nm for light polarized parallel to one optical axis.

18. A broadband partial reflector according to claim 10, further comprising an optically thick layer optically coupled to the first side or second side, wherein the optically thick layer is at least 10× thicker than at least one of the first plurality of optical repeating units.

19. A broadband partial reflector according to claim 10, further comprising an anti-reflection disposed on the first side or second side.

* * * * *